US011892077B2

(12) United States Patent
Yamada et al.

(10) Patent No.: US 11,892,077 B2
(45) Date of Patent: Feb. 6, 2024

(54) VEHICLE GEAR-SHIFTING CONTROL APPARATUS

(71) Applicant: Mazda Motor Corporation, Hiroshima (JP)

(72) Inventors: Makoto Yamada, Aki-gun (JP); Yasunari Nakayama, Aki-gun (JP); Yusuke Moriyama, Aki-gun (JP); Wataru Sakamoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/190,342

(22) Filed: Mar. 27, 2023

(65) Prior Publication Data

US 2023/0313883 A1 Oct. 5, 2023

(30) Foreign Application Priority Data

Apr. 5, 2022 (JP) .................................. 2022-063120

(51) Int. Cl.
| | |
|---|---|
| *F16H 59/74* | (2006.01) |
| *F16H 61/16* | (2006.01) |
| *F16H 59/42* | (2006.01) |
| F16H 59/14 | (2006.01) |
| F16H 61/28 | (2006.01) |

(52) U.S. Cl.
CPC ............ *F16H 61/16* (2013.01); *F16H 59/42* (2013.01); *F16H 59/74* (2013.01); *F16H 2059/147* (2013.01); *F16H 2059/743* (2013.01); *F16H 2061/163* (2013.01); *F16H 2061/2892* (2013.01)

(58) Field of Classification Search
CPC .......... F16H 61/16; F16H 59/42; F16H 59/74; F16H 2059/147; F16H 2059/743; F16H 2061/163; F16H 2061/2892
See application file for complete search history.

(56) References Cited

U.S. PATENT DOCUMENTS

2011/0184612 A1\* 7/2011 Fujii ..................... B60W 10/02
477/111

FOREIGN PATENT DOCUMENTS

| CN | 104285083 A | \* | 1/2015 | ............ B60W 10/04 |
|---|---|---|---|---|
| JP | 2012066673 A | \* | 4/2012 | |
| JP | 2016132432 A | | 7/2016 | |

\* cited by examiner

*Primary Examiner* — Justin Holmes
(74) *Attorney, Agent, or Firm* — Alleman Hall Creasman & Tuttle LLP

(57) ABSTRACT

A vehicle gear-shifting control apparatus is equipped with an engine, an automatic transmission, and a controller which changes a shift stage by outputting a gear-shifting signal in accordance with the rotation speed of an input shaft to the automatic transmission. The controller executes a torque-regulating control of temporarily increasing or decreasing an input torque input to the input shaft during a shift-change, and when executing the control, determines whether or not a target increase/decrease amount of the input torque can be realized based on calculation results of a target output torque and a target gear-shifting time, executes the control to realize the target amount when it is determined that the target amount can be realized, and executes the control based on an allowable gear-shifting time set in advance to be longer than the target gear-shifting time when it is determined that the target amount cannot be realized.

9 Claims, 9 Drawing Sheets

|  | CL1 | CL2 | CL3 | BR1 | BR2 |
|---|---|---|---|---|---|
| 1ST SPEED | O |  |  | O | O |
| 2ND SPEED |  | O |  | O | O |
| 3RD SPEED | O | O |  |  | O |
| 4TH SPEED |  | O | O |  | O |
| 5TH SPEED | O |  | O |  | O |
| 6TH SPEED | O | O | O |  |  |
| 7TH SPEED | O |  | O | O |  |
| 8TH SPEED |  | O | O | O |  |
| REVERSE SPEED |  |  | O | O | O |

FIG. 3

VEHICLE GEAR-SHIFTING CONTROL APPARATUS

TECHNICAL FIELD

The technique disclosed herein relates to a vehicle gear-shifting control apparatus.

BACKGROUND ART

For example, JP2016-132432A describes a control apparatus of a hybrid vehicle. The hybrid vehicle is equipped with an engine, a motor, and an automatic transmission. The engine and the motor are connected to an input shaft of the automatic transmission. The hybrid vehicle improves fuel efficiency performance by having the motor perform a regeneration operation when the automatic transmission performs a downshift.

In particular, the automatic transmission described in JP2016-132432A has a plurality of friction control mechanisms which independently control each of a plurality of friction elements. When indicating indicated hydraulic pressure to first and second friction control mechanisms among the plurality of friction control mechanisms, the control apparatus applies a delay operation processing to the indicated hydraulic pressure. According to JP2016-132432A, by applying the delay operation processing to each indicated hydraulic pressure, a temporal response delay can be taken into consideration.

SUMMARY OF INVENTION

Problem to be Solved by the Invention

A torque-regulating control in which an input torque (hereinafter, referred to as an "AT input torque") input to an input shaft of an automatic transmission is temporarily increased or decreased may be executed in order to suppress a torque shock which occurs when changing gears.

It was thought that, by performing such torque-regulating control, the torque shock can be suppressed without prolonging gear-shifting time. It was also thought that, by accurately adjusting a waveform of front-rear acceleration (hereinafter, also referred to as a "front-rear G-force") of a vehicle through an output torque (hereinafter, referred to as an "AT output torque") to be output from an output shaft of the automatic transmission in correspondence with the AT input torque, an adequate "gear-shifting feeling" is imparted to a driver.

However, as a result of intensive studies carried out by the present inventors, it was found that, depending on specifications of the automatic transmission such as inertia in the automatic transmission, undesirable irregularities are created in the AT output torque and, eventually, in the waveform of front-rear G-force as an amount of temporary increase or decrease of the AT input torque in the torque-regulating control increases.

During gear-shifting, the undesirable irregularities in the waveform of front-rear G-force cause an unnecessary fluctuation in the waveform such as a depression or a protrusion of front-rear G-force. Such unnecessary fluctuations are inconvenient due to causing a torque shock which imparts a sense of discomfort to the driver rather than imparting an adequate gear-shifting feeling to the driver.

For example, while a gear-shifting time can conceivably be prolonged in order to suppress an occurrence of the shock described earlier, prolonging the gear-shifting time leads to worsening of traveling feeling and is therefore inconvenient.

The present disclosure has been made in view of this point and an object thereof is to suppress an occurrence of a torque shock while preventing, as much as possible, a gear-shifting time from being prolonged.

Means for Solving the Problem

As a result of exhaustively carrying out intensive studies, the present inventors have derived the following relational expression.

$$tq = K1 \times \Delta R + K2 \times TQ \qquad (A)$$

In Expression (A) above, TQ denotes an AT output torque, $\Delta R$ denotes a time rate of change of the rotation speed that is input to an input shaft of an automatic transmission (input rotation gradient), and tq denotes an AT input torque corresponding to values thereof. K1 and K2 denote parameters determined according to specifications and/or design of the automatic transmission such as inertia. K1 and K2 are parameters which can be determined in advance based on a balance between inertia and torque or the like inside the automatic transmission.

The input rotation gradient in Expression (A) above is strongly related to a time required by the automatic transmission to change gears (gear-shifting time). Therefore, by respectively determining a desired AT output torque which does not cause a torque shock and a gear-shifting time which does not cause a decline in traveling feeling as target values, an AT input torque which realizes the target values can be determined based on Expression (A) above.

The present inventors considered that, by performing the torque-regulating control described earlier by respectively specifying the target values of the AT output torque and the gear-shifting time in advance and scrupulously calculating an AT input torque which realizes the target values, suppression of a torque shock and a traveling feeling can both be achieved.

However, the AT input torque calculated in such a manner may not always be realized depending on a state of an engine at a time point of the calculation. When the desired AT input torque is not realized, there is a possibility that the torque-regulating control may not function as intended and a torque shock which imparts a sense of discomfort to an occupant may be generated. The torque shock generated in such a manner may possibly impart a sense of discomfort to the driver.

The present inventors focused their attention on the fact that such a torque shock imparts a greater sense of discomfort to the driver as compared to a decline in traveling feeling which accompanies a prolongation of the gear-shifting time and have arrived at the present disclosure.

Specifically, the present disclosure relates to a vehicle gear-shifting control apparatus. The gear-shifting control apparatus includes an engine which is mounted to a vehicle and which generates a travel drive force of the vehicle, a hydraulically controlled automatic transmission which has an input shaft connected to the engine and an output shaft connected to a drive wheel of the vehicle and which subjects an input rotation to gear-shifting at a transmission gear ratio corresponding to a selected shift stage and outputs the gear-shifted input rotation, and a controller which changes the shift stage of the automatic transmission by outputting a gear-shifting signal in accordance with the rotation speed of the input shaft to the automatic transmission. The controller executes a torque-regulating control in which, during a shift-change of the shift stage, an input torque input to the input shaft is temporarily increased or decreased as compared to during a non-shift-change.

In addition, according to the present disclosure, when executing the torque-regulating control, the controller determines whether or not a target increase/decrease amount of the input torque can be realized under a present state of the engine based on calculation results according to the shift stage of a target value of an output torque which is output from the output shaft and a target value of a gear-shifting time which is required for the shift-change, executes the torque-regulating control so as to realize the target increase/decrease amount when it is determined that the target increase/decrease amount can be realized, and executes the torque-regulating control based on an allowable gear-shifting time set in advance to be longer than the target value of the gear-shifting time instead of based on the target value when it is determined that the target increase/decrease amount cannot be realized.

According to the configuration described above, the controller determines the target increase/decrease amount of the input torque based on respective target values of the output torque and the gear-shifting time which are calculated according to a shift stage. In addition, when the target increase/decrease amount can be realized, the controller executes the torque-regulating control so as to realize the target increase/decrease amount.

Adopting the configuration described above enables both the target value of the output torque and the target value of the gear-shifting time to be realized at desired values. Accordingly, an occurrence of a torque shock can be suppressed while suppressing a prolongation of the gear-shifting time. Since each target value is scrupulously set according to a shift stage, even a fluctuation of front-rear acceleration of a vehicle which leads to a torque shock can be accurately controlled.

On the other hand, when the target increase/decrease amount of the input torque cannot be realized, the controller executes the torque-regulating control based on an allowable gear-shifting time having been set to be a relatively prolonged time. Accordingly, an occurrence of a torque shock which may impart a greater sense of discomfort as compared to a decline in traveling feeling which accompanies a prolongation of the gear-shifting time can be reliably suppressed. As a result, a control mode in which a sense of discomfort imparted to each occupant including the driver is suppressed as much as possible can be realized in various scenes.

In addition, according to an aspect of the present disclosure, the controller may calculate a time rate of change of a rotation input to the input shaft based on the target value of the gear-shifting time and execute the torque-regulating control based on a result of the calculation and the target value of the output torque, and when it is determined that the target increase/decrease amount cannot be realized, the controller may calculate a second time rate of change corresponding to the allowable gear-shifting time as the time rate of change of the rotation input to the input shaft and execute the torque-regulating control based on the second time rate of change.

According to the configuration described above, the controller executes torque-regulating control based on the time rate of change of the rotation input to the input shaft. In this case, when the target increase/decrease amount of the input torque cannot be realized, the controller executes the torque-regulating control based on the time rate of change corresponding to an allowable gear-shifting time instead of the initial target value of the gear-shifting time. Accordingly, even when the target increase/decrease amount of the input torque cannot be realized, the torque-regulating control can be smoothly executed without any inconvenience. A smooth execution of the torque-regulating control contributes to suppressing an occurrence of a torque shock.

Furthermore, according to an aspect of the present disclosure, the controller may calculate a limit input torque indicating a limit value of the input torque which can be realized under a present state of the engine and determine whether or not the target increase/decrease amount can be realized under the present state of the engine based on the limit input torque, the controller may calculate a third time rate of change required for realizing the limit input torque while maintaining the target value of the output torque as the time rate of change of the rotation input to the input shaft when it is determined that the target increase/decrease amount cannot be realized, and the controller may execute the torque-regulating control based on the target value of the output torque and the third time rate of change while maintaining the target value of the output torque when the third time rate of change can be realized, and recalculate the target value of the output torque based on the second time rate of change and execute the torque-regulating control based on the recalculated target value of the output torque and the third time rate of change when the third time rate of change cannot be realized.

According to the configuration described above, the controller changes only a time rate of change of rotation based on the limit input torque while maintaining the output torque to the initial target value when the target increase/decrease amount of the input torque cannot be realized. When the third time rate of change obtained by the change can be realized, the torque-regulating control is executed without changing the output torque. Accordingly, an occurrence of a torque shock which may impart a greater sense of discomfort can be preferentially suppressed.

On the other hand, when the third time rate of change cannot be realized, the torque-regulating control is executed by not only using the second time rate of change but by also changing the target value of the output torque according to the second time rate of change.

Accordingly, by adopting a configuration in which the target value of the output torque is maintained as much as possible, an occurrence of a torque shock which may impart a greater sense of discomfort can be suppressed as much as possible.

Note that the determination of whether or not the third time rate of change can be realized can be made by comparing the third time rate of change and the second time rate of change with each other. In this case, the controller may determine that the third time rate of change can be realized when it is determined that the third time rate of change is equal to or higher than the second time rate of change but determine that the third time rate of change cannot be realized when it is determined that the third time rate of change is lower than the second time rate of change. Respective absolute values of the third time rate of change and the second time rate of change may be used when making the determination.

In addition, according to an aspect of the present disclosure, the target value of the output torque can be set such that a change rate with respect to the rotation speed of the input shaft is higher when the rotation speed is high than when the rotation speed is low.

Since a case where the rotation speed of the input shaft is high corresponds to a case where an acceleration request has been issued or the like, a certain amount of a torque shock is to be allowed. In other words, when the rotation speed is low, a greater sense of discomfort may be imparted than when the rotation speed is high. In order to suppress such a sense of discomfort, the output torque is to be set lower when the rotation speed is low. Accordingly, a sense of discomfort to be imparted to the driver can be more reliably suppressed.

Furthermore, according to an aspect of the present disclosure, the target value of the gear-shifting time can be set lower when the rotation speed of the input shaft is high than when the rotation speed is low.

As described earlier, a certain amount of a torque shock is to be allowed on a high-rotation-speed side. Therefore, by prioritizing faster gear-shifting on the high-rotation-speed side while suppressing an occurrence of a torque shock by gear-shifting over a prolonged period on a low-rotation-speed side, control modes respectively suitable for the low-rotation-speed side and the high-rotation-speed side can be realized.

In addition, according to an aspect of the present disclosure, the target value of the gear-shifting time can be set lower when the shift stage is high than when the shift stage is low.

Since a drive scene in which the shift stage is high basically corresponds to when traveling at a high vehicle speed, a certain amount of torque shock is to be allowed. In other words, when the shift stage is low, a greater sense of discomfort may be imparted than when the shift stage is high. In order to suppress such a sense of discomfort, the gear-shifting time is to be set longer when the rotation speed is low. By prolonging the gear-shifting time, a sense of discomfort to be imparted to the driver can be more reliably suppressed.

Furthermore, according to an aspect of the present disclosure, the target value of the gear-shifting time can be set constant regardless of whether the shift stage is high or low when the shift stage is equal to or lower than a predetermined stage.

According to the configuration described above, by setting the target value of the gear-shifting time to be constant regardless of whether the shift stage is high or low when the shift stage is equal to or lower than a predetermined stage, a certain gear-shifting feeling can be imparted to the driver. Accordingly, the traveling feeling of the vehicle can be enhanced.

In addition, according to an aspect of the present disclosure, the controller may change the shift stage by adjusting a difference in rotation speed between the input shaft and the output shaft and execute the torque-regulating control in conjunction with adjusting the difference in rotation speed, and the controller may determine whether or not the target increase/decrease amount of the input torque can be realized under the present state of the engine prior to starting the adjustment of the difference in rotation speed.

According to the configuration described above, a determination of the target increase/decrease amount can be executed at an earlier timing. Accordingly, the target increase/decrease amount can be fixed without being late for the start of gear-shifting control.

Advantageous Effect of Invention

As described above, according to the present disclosure, an occurrence of a shock can be suppressed while suppressing a prolongation of a gear-shifting time as much as possible.

BRIEF DESCRIPTION OF DRAWINGS

FIG. 3 shows a fastening table of an automatic transmission.

DESCRIPTION OF EMBODIMENT

Hereinafter, an embodiment of a vehicle gear-shifting control apparatus will be described with reference to the drawings. The gear-shifting control apparatus described herein is illustrative.

(Hybrid Automobile)

Figure 1:
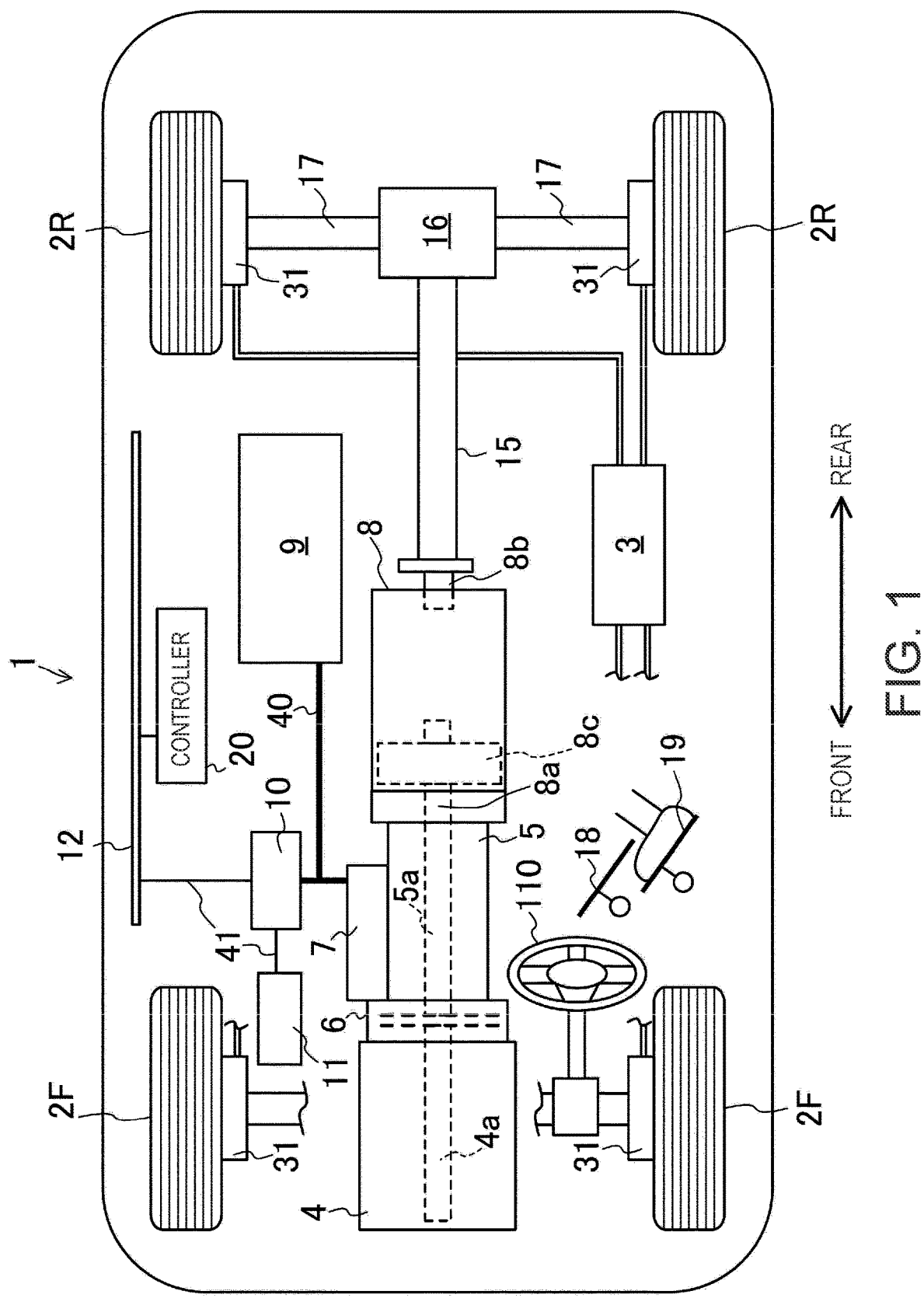
FIG. 1 shows a hybrid automobile.

FIG. 1 shows an automobile 1 (an example of the vehicle) to which the disclosed technique is applied. The automobile 1 is a hybrid automobile capable of traveling using electrical power. The automobile 1 has a total of four wheels including front wheels 2F and rear wheels 2R. Friction brakes 31 are respectively attached to the front wheels 2F and the rear wheels 2R in order to apply braking on rotations of the front wheels 2F and the rear wheels 2R.

An engine 4 and a motor 5 which generate a travel drive force of the automobile 1 are mounted to the automobile 1 as drive sources. The engine 4 and the motor 5 cooperate with each other to drive the rear wheels 2R. Accordingly, the automobile 1 travels. The automobile 1 is a rear-wheel drive vehicle. The motor 5 is not only used as a drive source but is also used as a generator during regeneration.

The automobile 1 is equipped with a high-voltage battery 9 of which a rated voltage is 50 V or lower as will be described later. Due to supply of power from the high-voltage battery 9, traveling is carried out as the motor 5 mainly provides assistance to the engine 4 (a so-called mild hybrid vehicle). Alternatively, the automobile 1 may be a so-called plug-in hybrid vehicle to which electrical power can be supplied from an outside power source.

In the case of the automobile 1, the engine 4 is disposed on a front side of a vehicle body and the drive wheels are arranged on a rear side of the vehicle body. In other words, the automobile 1 is a so-called front-engine, rear-wheel drive (FR) vehicle.

In addition to the engine 4 and the motor 5, the automobile 1 is equipped with a K0 clutch 6, an inverter 7, and an automatic transmission 8 as apparatuses of a drive system. The automobile 1 is also equipped with a controller 20 as an apparatus of a control system. The automobile 1 is also equipped with a friction brake system 3 including friction brakes 31 as an apparatus of a brake system.

(Apparatuses of Drive System)

For example, the engine 4 is an internal combustion engine which burns fossil fuel. The engine 4 is also a so-called four-cycle engine which generates rotative power by repeating the respective cycles of intake, compression, expansion, and exhaust. While the engine 4 is available in various types or modes such as a spark-ignited engine and a compression-ignited engine, the type or the mode of the engine 4 is not particularly limited in the disclosed technique.

In the automobile 1, the engine 4 is disposed approximately in a center part in a vehicle width direction in a state where a crankshaft 4a which outputs rotative power is oriented in a front-rear direction of the vehicle body. Various apparatuses and mechanisms associated with the engine 4 such as an intake system, an exhaust system, and a fuel supply system are installed in the automobile 1.

The motor 5 is a permanent magnet-type synchronous motor which is driven by a three-phase AC current. The motor 5 is serially disposed to the rear of the engine 4 via the K0 clutch 6. The motor 5 is also serially disposed to the front of the automatic transmission 8.

The K0 clutch 6 is installed so as to be interposed between a front end part of a shaft 5a of the motor 5 and the crankshaft 4a of the engine 4. The K0 clutch 6 switches between a state (connected state) in which the crankshaft 4a and the shaft 5a are connected to each other and a state (disconnected state) in which the crankshaft 4a and the shaft 5a are disconnected from each other.

A rear end part of the shaft 5a of the motor 5 is connected to an input shaft 8a of the automatic transmission 8. Therefore, the engine 4 is connected to the automatic transmission 8 via the K0 clutch 6 and the shaft 5a. By putting the K0 clutch 6 in the disconnected state, the engine 4 is detached from the automatic transmission 8.

During traveling of the automobile 1, the K0 clutch 6 is switched between the connected state and the disconnected state. For example, during deceleration of the automobile 1, regeneration may be performed in a state where the K0 clutch 6 is switched to the disconnected state and the engine 4 is detached.

The motor 5 is connected via the inverter 7 and a high-voltage cable 40 to the high-voltage battery 9 which is mounted as a drive power source. In the case of the automobile 1, a DC battery with a rated voltage of 50 V or lower or, specifically, a 48 V DC battery is used as the high-voltage battery 9.

The high-voltage battery 9 supplies high-voltage DC power to the inverter 7. The inverter 7 converts the DC power into three-phase AC and feeds the converted power to the motor 5. Accordingly, the motor 5 is rotatively driven. In addition, the motor 5 supplies regenerative energy to the high-voltage battery 9.

The high-voltage battery 9 is also connected to a DC-DC converter 10 via the high-voltage cable 40. The DC-DC converter 10 converts high-voltage DC power of 48 V into low-voltage DC power of 12 V and outputs the converted low-voltage DC power. The DC-DC converter 10 (an output side thereof) is connected to a low-voltage battery 11 (a so-called lead-acid battery) via a low-voltage cable 41.

The low-voltage battery 11 is connected to various electrical components via the low-voltage cable 41. The DC-DC converter 10 is also connected to a CAN 12 (Controller Area Network) via the low-voltage cable 41. Accordingly, the DC-DC converter 10 supplies low-voltage DC power to the CAN 12.

The automatic transmission 8 is a hydraulically controlled multi-stage automatic transmission (a so-called AT). The automatic transmission 8 has the input shaft 8a to be connected to the engine 4 and an output shaft 8b to be connected to drive wheels (the rear wheels 2R) of the automobile 1. The automatic transmission 8 is capable of gear-shifting a rotation input to the input shaft 8a by a transmission gear ratio corresponding to a shift stage selected by the driver and outputting the gear-shifted rotation.

Specifically, the input shaft 8a is disposed in a front end part of the automatic transmission 8. As described above, the input shaft 8a is connected to the shaft 5a of the motor 5. The output shaft 8b is disposed in a rear end part of the automatic transmission 8. The output shaft 8b rotates independently of the input shaft 8a.

A transmission mechanism made up of a torque converter 8c, a plurality of planetary gear mechanisms, a plurality of friction fastening elements, and the like is built in between the input shaft 8a and the output shaft 8b. Each friction fastening element is switched between a fastened state and a non-fastened state by hydraulic pressure.

-Details of Transmission-

Figure 2:
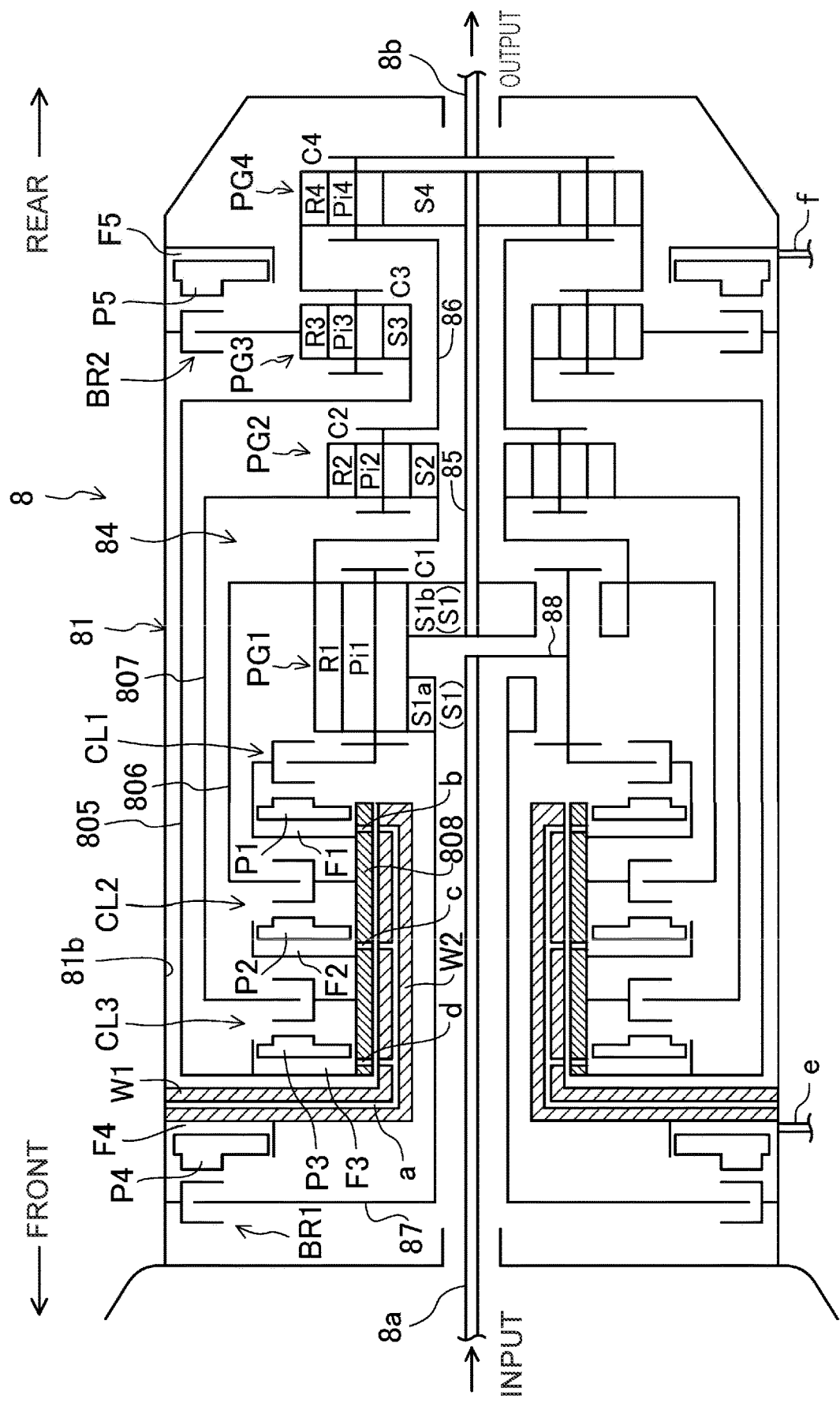
FIG. 2 shows a configuration of an automatic transmission.

FIG. 2 shows a configuration of the automatic transmission 8. The automatic transmission 8 is a longitudinally-placed automatic transmission to be mounted to an FR vehicle.

The automatic transmission 8 has a transmission case 81, the input shaft 8a which is inserted into the transmission case 81 and into which motive power from the drive sources (engine, motor, and the like) of the automobile 1 is input, a transmission mechanism 84 which is housed inside the transmission case 81 and to which motive power from the drive sources is transmitted via the input shaft 8a, and the output shaft 8b which is inserted into the transmission case 81 and which outputs the motive power from the transmission mechanism 84 to a propeller shaft.

The automatic transmission 8 is a transmission which is directly connected to the drive sources described above without being connected via the torque converter. In other words, the input shaft 8a is directly connected to the output shafts of the drive sources.

The input shaft 8a and the output shaft 8b are coaxially disposed in the front-rear direction of the vehicle and, in a state where the automatic transmission 8 is mounted to the vehicle, the input shaft 8a is positioned on a front side of the vehicle and the output shaft 8b is positioned on a rear side of the vehicle. In the following description, a side of the drive sources described above (a left side in FIG. 1) in an axial direction of the input shaft 8a (an axial direction of the output shaft 8b) will be referred to as a front side and an opposite side to the drive sources described above (a right side in FIG. 1) in the axial direction of the input shaft 8a will be referred to as a rear side.

The transmission mechanism 84 has a first planetary gear set PG1 (hereinafter, referred to as a first gear set PG1), a second planetary gear set PG2 (hereinafter, referred to as a second gear set PG2), a third planetary gear set PG3 (hereinafter, referred to as a third gear set PG3), and a fourth planetary gear set PG4 (hereinafter, referred to as a fourth gear set PG4) which are aligned in the axial direction of the input shaft 8a. The first gear set PG1, the second gear set PG2, the third gear set PG3, and the fourth gear set PG4 are aligned in this order from the front side and form a plurality of motive power transmitting paths from the input shaft 8a to output gears 13. The first to fourth gear sets PG1 to PG4 are disposed on a same axial line as the input shaft 8a and the output shaft 8b.

The first gear set PG1 has a first sun gear S1, a first ring gear R1, and a first carrier C1 as rotational elements. The first gear set PG1 is a single pinion type and a plurality of pinions Pi1 which are supported by the first carrier C1 and which are disposed spaced apart from each other in a circumferential direction of the first gear set PG1 mesh with both the first sun gear S1 and the first ring gear R1.

The second gear set PG2 has a second sun gear S2, a second ring gear R2, and a second carrier C2 as rotational elements. The second gear set PG2 is also a single pinion type and a plurality of pinions Pi2 which are supported by the second carrier C2 and which are disposed spaced apart from each other in a circumferential direction of the second gear set PG2 mesh with both the second sun gear S2 and the second ring gear R2.

The third gear set PG3 has a third sun gear S3, a third ring gear R3, and a third carrier C3 as rotational elements. The third gear set PG3 is also a single pinion type and a plurality of pinions Pi3 which are supported by the third carrier C3 and which are disposed spaced apart from each other in a circumferential direction of the third gear set PG3 mesh with both the third sun gear S3 and the third ring gear R3.

The fourth gear set PG4 has a fourth sun gear S4, a fourth ring gear R4, and a fourth carrier C4 as rotational elements. The fourth gear set PG4 is also a single pinion type and a plurality of pinions Pi4 which are supported by the fourth carrier C4 and which are disposed spaced apart from each other in a circumferential direction of the fourth gear set PG4 mesh with both the fourth sun gear S4 and the fourth ring gear R4.

The first sun gear S1 of the first gear set PG1 is divided in two in the axial direction of the input shaft $8a$ and has a front-side first sun gear S1$a$ which is relatively disposed on the front side and a rear-side first sun gear S1$b$ which is relatively disposed on the rear side. In other words, the first gear set PG1 is a double sun gear-type gear set. Since the front-side and rear-side first sun gears S1$a$ and S1$b$ have a same number of teeth and mesh with the pinions Pi1 which are supported by the first carrier C1, the rotation speeds of the front-side and rear-side first sun gears S1$a$ and S1$b$ are always the same. In other words, the front-side and rear-side first sun gears S1$a$ and S1$b$ always rotate at a same rotational speed and, when the rotation of one of the gears stops, the rotation of the other gear also stops.

The first sun gear S1 (to be exact, the rear-side first sun gear S1$b$) and the fourth sun gear S4 are always connected to each other, the first ring gear R1 and the second sun gear S2 are always connected to each other, the second carrier C2 and the fourth carrier C4 are always connected to each other, and the third carrier C3 and the fourth ring gear R4 are always connected to each other. In addition, the input shaft $8a$ is always connected to the first carrier C1, and the output shaft $8b$ is always connected to the fourth carrier C4. Specifically, the input shaft $8a$ is connected to the first carrier C1 via a motive power transmission member 88 which passes between the front-side and rear-side first sun gears S1$a$ and S1$b$. The rear-side first sun gear S1$b$ and the fourth sun gear S4 are connected to each other via a motive power transmission shaft 85. The second carrier C2 and the fourth carrier C4 are connected to each other via a motive power transmission member 86.

The transmission mechanism 84 also has five friction fastening elements (a first clutch CL1, a second clutch CL2, a third clutch CL3, a first brake BR1, and a second brake BR2) for selecting one motive power transmitting path from the plurality of motive power transmitting paths formed by the first to fourth gear sets PG1 to PG4 and switching to the selected motive power transmitting paths.

The first clutch CL1 is configured to connect and disconnect between the input shaft $8a$ and the first carrier C1, and the third sun gear S3. The first clutch CL1 is arranged on the front side of the first gear set PG1.

The second clutch CL2 is configured to connect and disconnect between the first ring gear R1 and the second sun gear S2, and the third sun gear S3. The second clutch CL2 is arranged on the front side of the first clutch CL1.

The third clutch CL3 is configured to connect and disconnect between the second ring gear R2 and the third sun gear S3. The third clutch CL3 is arranged on the front side of the second clutch CL2.

The third sun gear S3 and all of the first clutch CL1, the second clutch CL2, and the third clutch CL3 are connected via a motive power transmission member 805 and a motive power transmission member 808, the first ring gear R1 and the second sun gear S2, and the second clutch CL2 are connected via a motive power transmission member 806 of the second clutch CL2, and the second ring gear R2 and the third clutch CL3 are connected via a motive power transmission member 807 of the third clutch CL3.

Specifically, the first clutch CL1 has a rotatable inside holding member which is connected to the first carrier C1, a hub-side friction plate which is engaged with an outer circumferential surface of the inside holding member, a rotatable outside holding member which is connected to the third sun gear S3 via the motive power transmission members 805 and 808, a drum-side friction plate which is engaged with an inner circumferential surface of the outside holding member, and a piston P1 which is reciprocally driven in the axial direction in order to bring the hub-side friction plate and the drum-side friction plate into pressure contact with each other. A hydraulic chamber F1 into which hydraulic pressure supplied from a valve body (not illustrated) is introduced is demarcated at a position adjacent to the piston P1, and the hub-side friction plate and the drum-side friction plate are brought into pressure contact or released from pressure contact according to the supply or exhaust of the hydraulic pressure to or from the hydraulic chamber F1. In addition, due to the pressure contact or the release from the pressure contact, the inside holding member and the outside holding member are connected to each other or disconnected from each other and, accordingly, the input shaft $8a$ and the first carrier C1, and the third sun gear S3 are connected to or disconnected from each other.

The second clutch CL2 has a rotatable inside holding member which is connected to the third sun gear S3 via the motive power transmission members 805 and 808, a hub-side friction plate which is engaged with an outer circumferential surface of the inside holding member, a rotatable outside holding member which is connected to the first ring gear R1 and the second sun gear S2 via the motive power transmission member 807, a drum-side friction plate which is engaged with an inner circumferential surface of the outside holding member, and a piston P2 which is reciprocally driven in the axial direction in order to bring the hub-side friction plate and the drum-side friction plate into pressure contact with each other. A hydraulic chamber F2 into which hydraulic pressure supplied from the valve body is introduced is demarcated at a position adjacent to the piston P2, and due to the hub-side friction plate and the drum-side friction plate being brought into pressure contact or released from pressure contact according to the supply or exhaust of the hydraulic pressure to or from the hydraulic chamber F2, the first ring gear R1 and the second sun gear S2, and the third sun gear S3 are connected to or disconnected from each other.

The third clutch CL3 has a rotatable inside holding member which is connected to the third sun gear S3 via the motive power transmission members 805 and 808, a hub-side friction plate which is engaged with an outer circumferential surface of the inside holding member, a rotatable outside holding member which is connected to the second ring gear R2 via the motive power transmission member 806, a drum-side friction plate which is engaged with an inner circumferential surface of the outside holding member, and a piston P3 which is reciprocally driven in the axial direction in order to bring the hub-side friction plate and the drum-side friction plate into pressure contact with each other. A hydraulic chamber F3 into which hydraulic pressure supplied from a valve body is introduced is demarcated at a position adjacent to the piston P3, and due to the hub-side friction plate and the drum-side friction plate being brought into pressure contact or released from pressure contact according to the supply or exhaust of the hydraulic pressure to or from the hydraulic chamber F3, the second ring gear R2 and the third sun gear S3 are connected to or disconnected from each other.

The first brake BR1 is configured to connect and disconnect between the first sun gear S1 (to be exact, the front-side first sun gear S1a) and the transmission case 81. The first brake BR1 is disposed in a vicinity of the transmission case 81 on the front side of the third clutch CL3. During fastening of the first brake BR1, the first sun gear S1 is fixed to the transmission case 81.

The second brake BR2 is configured to connect and disconnect between the third ring gear R3 and the transmission case 81. During fastening of the second brake BR2, the third ring gear R3 is fixed to the transmission case 81.

Specifically, the first brake BR1 has a rotatable inside holding member which is connected to the front-side first sun gear S1a via a motive power transmission member 87, a hub-side friction plate which is engaged with an outer circumferential surface of the inside holding member, a nonrotatable outside holding member which is connected to the transmission case 81, a drum-side friction plate which is engaged with an inner circumferential surface of the outside holding member, and a piston P4 which is reciprocally driven in the axial direction in order to bring the hub-side friction plate and the drum-side friction plate into pressure contact with each other. A hydraulic chamber F4 into which hydraulic pressure supplied from a valve body is introduced is demarcated at a position adjacent to the piston P4, and due to the hub-side friction plate and the drum-side friction plate being brought into pressure contact or released from pressure contact according to the supply or exhaust of the hydraulic pressure to or from the hydraulic chamber F4, the transmission case 81 and the first sun gear S1 are connected to or disconnected from each other.

The second brake BR2 has a rotatable inside holding member which is connected to the third ring gear R3, a hub-side friction plate which is engaged with an outer circumferential surface of the inside holding member, a nonrotatable outside holding member which is connected to the transmission case 81, a drum-side friction plate which is engaged with an inner circumferential surface of the outside holding member, and a piston P5 which is reciprocally driven in the axial direction in order to bring the hub-side friction plate and the drum-side friction plate into pressure contact with each other. A hydraulic chamber F5 into which hydraulic pressure supplied from a valve body is introduced is demarcated at a position adjacent to the piston P5, and due to the hub-side friction plate and the drum-side friction plate being brought into pressure contact or released from pressure contact according to the supply or exhaust of the hydraulic pressure to or from the hydraulic chamber F5, the transmission case 81 and the third ring gear R3 are connected to or disconnected from each other.

At an axial direction position between the first brake BR1 and the third clutch CL3, the transmission case 81 has an annular raised wall W1 which extends toward a radial-direction inner side from an inner circumferential surface 81b of the transmission case 81 and a cylindrical wall W2 with a cylindrical shape which extends rearward from an inner circumferential end of the raised wall W1. The cylindrical wall W2 is formed so as to concentrically extend along an inner circumferential surface of the motive power transmission member 808.

Three housings which are aligned in the axial direction are formed on a radial-direction outer side of the motive power transmission member 808 and the respective pistons P1, P2, and P3 of the first clutch CL1, the second clutch CL2, and the third clutch CL3 are each housed in the three housings.

An oil passage for supplying hydraulic pressure to each of the hydraulic chambers F1, F2, and F3 of the first clutch CL1, the second clutch CL2, and the third clutch CL3 are formed in the raised wall W1, the cylindrical wall W2, and the motive power transmission member 808. Specifically, an oil passage a is formed in the raised wall W1 and the cylindrical wall W2, and oil passages b, c, and d are formed in the motive power transmission member 808. In addition, hydraulic pressure is supplied to the hydraulic chamber F1 of the first clutch CL1 through the oil passage a and the oil passage b, hydraulic pressure is supplied to the hydraulic chamber F2 of the second clutch CL2 through the oil passage a and the oil passage c, and hydraulic pressure is supplied to the hydraulic chamber F3 of the third clutch CL3 through the oil passage a and the oil passage d.

Although not illustrated, communicating portions between the oil passage a and the oil passages b, c, and d between the outer circumferential surface of the cylindrical wall W2 and an inner circumferential surface of the motive power transmission member 808 are respectively sealed by seal rings.

The piston P4 of the first brake BR1 is housed in a housing which is formed on the front side of the raised wall W1. An oil passage e is directly communicated from outside (valve body) of the transmission case 81 to the hydraulic chamber F4 demarcated by the housing.

The piston P5 of the second brake BR2 is housed in a housing which is fitted to the inner circumferential surface 81b in a rear part of the transmission case 81. An oil passage f is directly communicated from outside (valve body) of the transmission case 81 to the hydraulic chamber F5 demarcated by the housing.

According to the automatic transmission 8 configured as described above, the five friction fastening elements (CL1, CL2, CL3, BR1, and BR2) described earlier are fastened by supplying operating oil to the hydraulic chambers F1 to F5.

FIG. 3 shows a fastening table of the automatic transmission 8. A circle symbol in the table indicates fastening. As described earlier, three clutches including the first clutch CL1, the second clutch CL2, and the third clutch CL3 and two brakes including the first brake BR1 and the second brake BR2 are incorporated into the automatic transmission 8 as friction fastening elements.

The automatic transmission 8 selects and fastens three elements from among the three clutches and the two brakes according to hydraulic control. Accordingly, the shift stage of the automatic transmission is switched to any one of forward shift stages from a first speed to an eighth speed and a reverse shift stage (reverse speed).

Specifically, the first speed is formed by fastening of the first clutch CL1, the first brake BR1, and the second brake BR2. The second speed is formed by fastening of the second clutch CL2, the first brake BR1, and the second brake BR2. The third speed is formed by fastening of the first clutch CL1, the second clutch CL2, and the second brake BR2. The fourth speed is formed by fastening of the second clutch CL2, the third clutch CL3, and the second brake BR2. The fifth speed is formed by fastening of the first clutch CL1, the third clutch CL3, and the second brake BR2. The sixth speed is formed by fastening of the first clutch CL1, the second clutch CL2, and the third clutch CL3. The seventh speed is formed by fastening of the first clutch CL1, the third clutch CL3, and the first brake BR1. The eighth speed is formed by fastening of the second clutch CL2, the third clutch CL3, and the first brake BR1. The reverse speed is formed by fastening of the third clutch CL3, the first brake BR1, and the second brake BR2.

In addition, for example, when shifting up from the first speed, by fastening the second clutch CL2 instead of the first clutch CL1, the shift stage is switched from the first speed to the second speed. By fastening the first clutch CL1 instead of the first brake BR1, the shift stage is switched from the second speed to the third speed. By fastening the third clutch CL3 instead of the first clutch CL1, the shift stage is switched from the third speed to the fourth speed.

Shifting up to the fifth speed is performed in a similar manner. Shifting down involves an opposite procedure to the switching performed when shifting up.

When elements to be fastened in each shift stage are not fastened, a state is created where the input shaft 8a and the output shaft 8b are detached from each other (so-called neutral). Even when rotative power is input to the automatic transmission 8 from the drive sources, the rotative power is not output from the automatic transmission 8.

The automatic transmission 8 may be shifted to neutral during deceleration of the automobile 1. Specifically, when the automatic transmission 8 is in the second speed, the third speed, or the fourth speed, the automatic transmission 8 is shifted to neutral by opening the second clutch CL2. In addition, when the automatic transmission 8 is in the fifth speed, the sixth speed, the seventh speed, or the eighth speed, the automatic transmission 8 is shifted to neutral by opening the third clutch CL3. The second clutch CL2 and the third clutch CL3 may be collectively referred to as a K1 clutch. Opening the K1 clutch during deceleration of the automobile 1 means blocking motive power transmission between the input shaft 8a and the output shaft 8b of the automatic transmission 8 and shifting the automatic transmission 8 to neutral.

As shown in FIG. 1, the output shaft 8b of the automatic transmission 8 is connected to a differential gear 16 via a propeller shaft 15 which extends in the front-rear direction of the vehicle body. A pair of drive shafts 17 which extend in a vehicle width direction and which is connected to the left and right rear wheels 2R are connected to the differential gear 16. Rotative power output through the propeller shaft 15 is distributed by the differential gear 16 and then transmitted to each rear wheel 2R though the pair of drive shafts 17.

(Gear-Shifting Control Apparatus)

Figure 4:
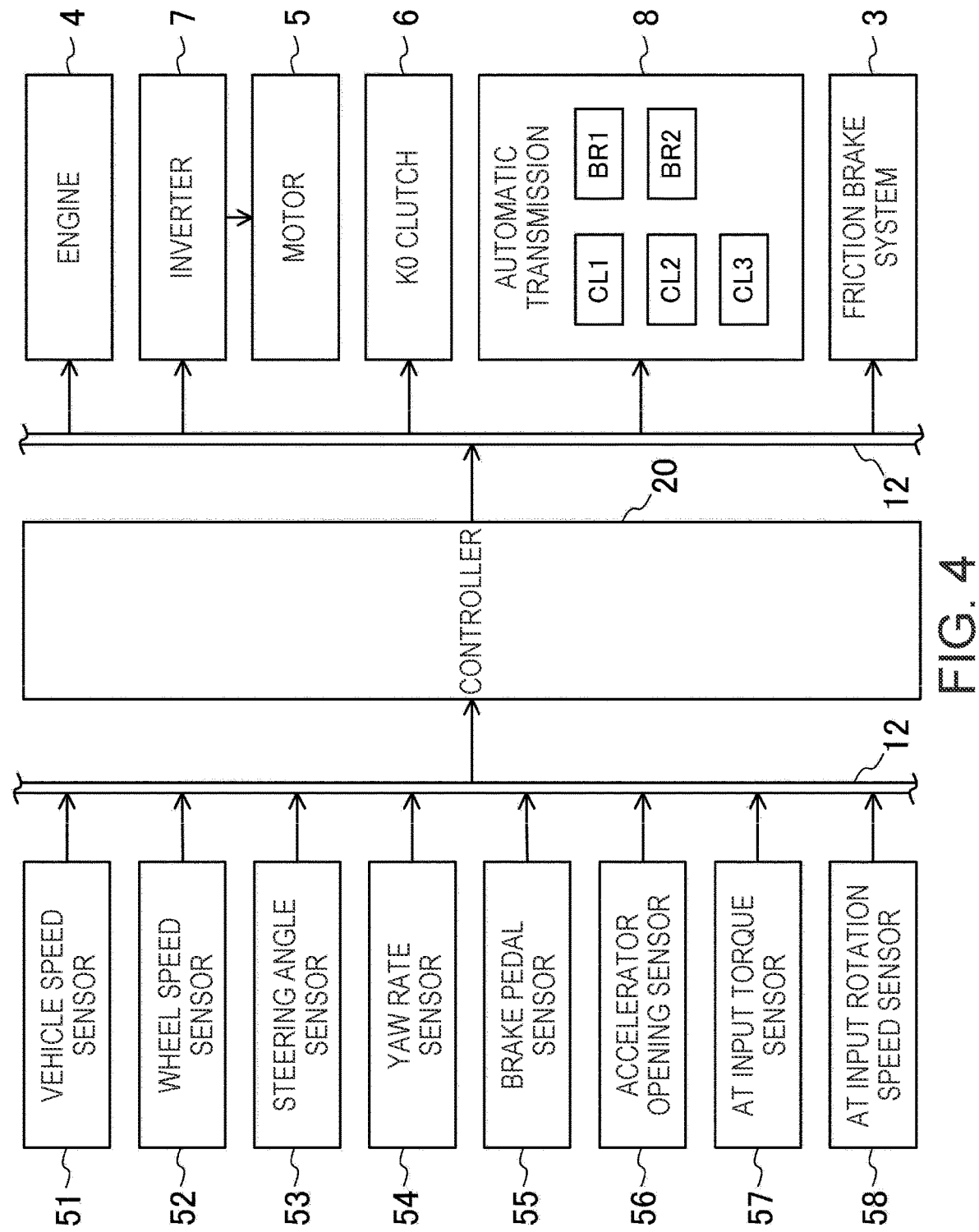
FIG. 4 is a block diagram of a gear-shifting control apparatus.

FIG. 3 is a block diagram of a gear-shifting control apparatus. The controller 20 described above is installed in the automobile 1 in order to control the engine 4, the motor 5, the K0 clutch 6, the automatic transmission 8, the friction brake system 3, and the like according to operations by the driver to control traveling of the automobile 1. The controller 20 is made up of hardware including a processor, memory, and an interface and software including a database and a control program. Note that while one controller 20 is shown in the gear-shifting control apparatus shown in FIG. 4, the controller of the gear-shifting control apparatus may be divided into a unit (powertrain control module (PCM)) which mainly controls operations of the drive sources (the engine 4 and the motor 5) and a unit (transmission control module (TCM)) which mainly controls operations of the K0 clutch 6 and the automatic transmission 8. The PCM and the TCM are connected by the CAN 12 and are configured to be capable of performing telecommunications with each other.

The gear-shifting control apparatus is equipped with sensors which measure various parameters related to traveling of a vehicle. Specifically, the gear-shifting control apparatus is equipped with a vehicle speed sensor 51, a wheel speed sensor 52, a steering angle sensor 53, a yaw rate sensor 54, a brake pedal sensor 55, an accelerator opening sensor 56, an AT input torque sensor 57, and an AT input rotation speed sensor 58.

The vehicle speed sensor 51 outputs a signal corresponding to a vehicle speed of the automobile 1. The wheel speed sensor 52 outputs a signal corresponding to the rotation speed of each wheel among the four wheels 2F and 2R of the automobile 1.

The steering angle sensor 53 outputs a signal corresponding to a rotation angle of a steering wheel 110 (refer to FIG. 1) operated by the driver or, in other words, a steering angle. The yaw rate sensor 54 outputs a signal corresponding to a yaw rate of the automobile 1.

The brake pedal sensor 55 outputs a signal corresponding to pedaling of a brake pedal 19 (refer to FIG. 1) operated by the driver. The accelerator opening sensor 56 outputs a signal corresponding to pedaling of an accelerator pedal 18 (refer to FIG. 1) operated by the driver.

The AT input torque sensor 57 outputs a signal corresponding to an input torque to the input shaft 8a of the automatic transmission 8. The AT input rotation speed sensor 58 outputs a signal corresponding to the rotation speed of the input shaft 8a of the automatic transmission 8.

The controller 20 receives, via the CAN 12, signals output by the sensors. The controller 20 outputs control signals to the engine 4, the inverter 7, the K0 clutch 6, the automatic transmission 8, and the friction brake system 3 through the CAN 12. Accordingly, the controller 20 controls the engine 4, the motor 5, the K0 clutch 6, the automatic transmission 8, and the friction brake system 3.

For example, by outputting a gear-shifting signal according to the rotation speed of the input shaft 8a to the automatic transmission 8 as gear-shifting control, the controller 20 can perform control of changing a shift stage of the automatic transmission 8. By changing the shift stage, an upshift and a downshift described earlier can be realized. In doing so, the controller 20 executes the change of the shift stage by adjusting a difference in rotation speed between the input shaft 8a and the output shaft 8b. A "gear-shifting time" described after may be considered a period for adjusting the difference in rotation speed between the input shaft 8a and the output shaft 8b. During the adjustment of the rotation speed, the automatic transmission 8 temporarily shifts to neutral.

Generally, when a change in rotation occurs during gear-shifting, a torque (a so-called moment of inertia) is generated according to the amount of change and the friction fastening elements which are switched in the automatic transmission 8. The moment of inertia may possibly cause a fluctuation in a short period of time in the front-rear acceleration of an automobile and impart a torque shock to its occupants.

In consideration thereof, during a shift-change of a shift stage, the controller 20 executes a torque-regulating control of temporarily increasing or decreasing an AT input torque which is input to the input shaft 8*a* of the automatic transmission 8 as compared to during a non-shift-change. In the torque-regulating control, the controller 20 temporarily increases or decreases the AT input torque by regulating an AT output torque of the engine 4 and/or the motor 5. The torque-regulating control contributes to suppressing a torque shock attributable to moment of inertia. A temporary increase or decrease of the AT input torque can be performed mainly using the motor 5.

Note that the controller 20 is configured to execute the torque-regulating control in conjunction with adjusting the difference in rotation speed between the input shaft 8*a* and the output shaft 8*b*. In particular, the controller 20 according to the present embodiment is configured to execute the torque-regulating control during a gear-shifting period (more specifically, during an adjustment period of the difference in rotation speed) of the automatic transmission 8 as shown at a time t2 and a time t3 in FIG. 9 to be described later.

In other words, "a temporarily increase or decrease in the AT input torque" according to the present embodiment means to "increase or decrease the AT input torque during the gear-shifting period of the automatic transmission 8." It is not essential to make an execution period of the torque-regulating control and the gear-shifting period strictly coincident with each other.

More specifically, during an upshift of a shift stage, front-rear G-force changes so as to temporarily rise simultaneously with a rotation change. The abrupt rise of the front-rear G-force acts so as to thrust the occupants upward. In this case, the controller 20 executes the torque-regulating control by temporarily decreasing the AT input torque.

On the other hand, during a downshift of a shift stage, The front-rear G-force changes so as to temporarily decrease simultaneously with a rotation change. The abrupt decrease in the front-rear G-force acts so as to pull the occupants inward. In this case, the controller 20 executes the torque-regulating control by temporarily increasing the AT input torque.

It was thought that, by performing the torque-regulating control described above, a torque shock can be suppressed without prolonging the gear-shifting time. It was also thought that, by accurately adjusting a waveform of the front-rear G-force (hereinafter, also referred to as a "G-force waveform") through the AT output torque to be output in correspondence with the AT input torque, an adequate "gear-shifting feeling" is imparted to a driver.

However, as a result of intensive studies carried out by the present inventors, it was found that, depending on specifications of the automatic transmission 8 such as inertia in the automatic transmission 8, unnecessary irregularities are created in the AT output torque which is output from the output shaft 8*b* of the automatic transmission 8 and, eventually, in the waveform of front-rear G-force as an amount of increase/decrease of the AT input torque increases.

For example, during an upshift of a shift stage, when the amount of decrease of the AT input torque is large, a depression may possibly be created in the G-force waveform as compared to when the amount of decrease is small. In contrast, during a downshift of a shift stage, when the amount of increase of the AT input torque is large, a protrusion may possibly be created in the G-force waveform as compared to when the amount of increase is small.

Undesirable irregularities in the G-force waveform cause an unnecessary fluctuation in the G-force waveform such as a depression or a protrusion of the front-rear G-force during gear-shifting. Such unnecessary fluctuations are inconvenient due to causing a torque shock which imparts a sense of discomfort to the driver rather than imparting an adequate gear-shifting feeling to the driver.

For example, while a gear-shifting time can conceivably be prolonged in order to suppress an occurrence of such a shock, prolonging the gear-shifting time leads to worsening of traveling feeling and is therefore inconvenient.

In consideration thereof, the controller 20 according to the present embodiment back-calculates, according to a desired gear-shifting time and a desired AT output torque (in other words, an AT output torque which brings about a G-force waveform that imparts an adequate gear-shifting feel), an AT input torque necessary for realizing the gear-shifting time and the AT output torque. In doing so, the controller 20 also determines whether or not the calculated AT input torque can be realized based on a present state of the engine 1.

Hereinafter, a finding to serve as a prerequisite for processing (gear-shifting processing) related to the calculation and a feasibility of realization of the AT input torque will be described and, subsequently, gear-shifting processing will be described in detail.

(Modeling of AT Input Torque)

Figure 5:
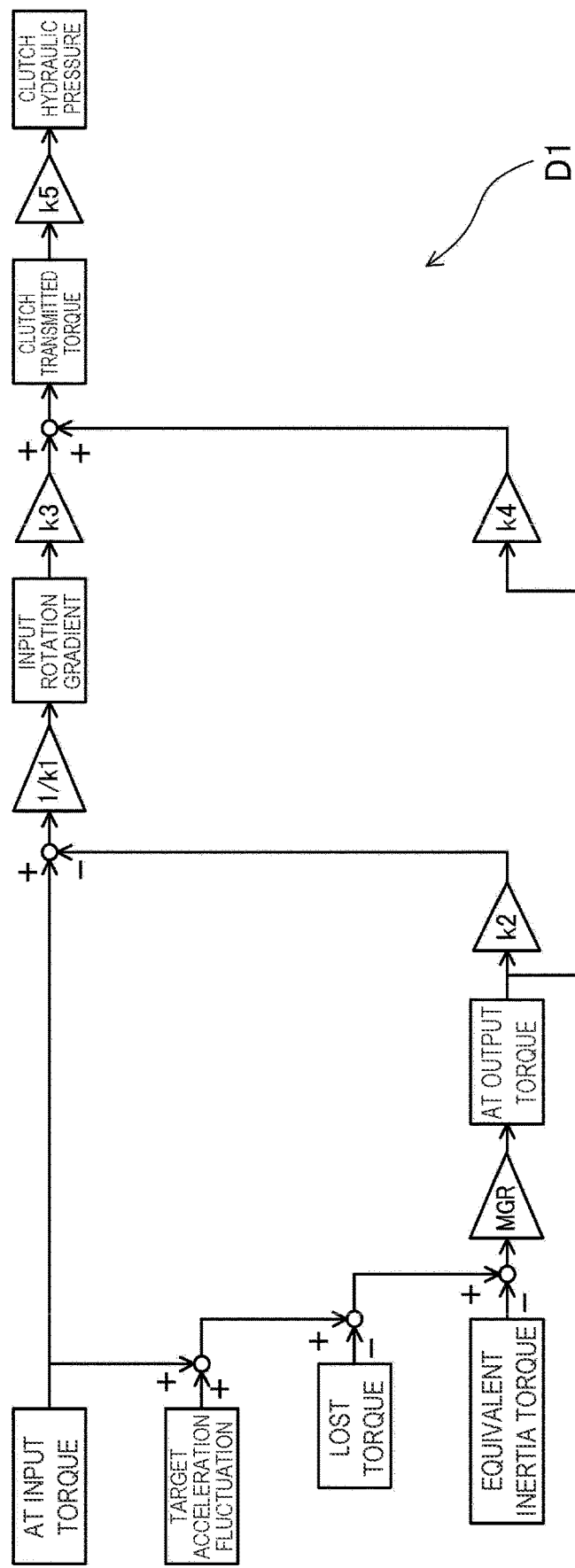
FIG. 5 is a block line diagram representing a finding related to modeling of an AT input torque.

FIG. 5 is a block line diagram representing a finding related to modeling of an AT input torque. A diagram D1 shown in FIG. 5 particularly shows a block line diagram during an upshift.

The present inventors carried out a study of modeling of the AT output torque based on a ratio of a speed difference with respect to an input of each section of the automatic transmission 8 exemplified in FIG. 2 and a balance of torque at each location of a skeleton created by modeling the automatic transmission 8.

For example, when studying a ratio of a speed difference, inertia of each component of the automatic transmission 8 was studied and, at the same time, a torque attributable to the inertia was studied for each shift stage. In addition, when studying the balance of torque, the balance at each location in the automatic transmission 8 such as the five friction fastening elements (CL1, CL2, CL3, BR1, and BR2) and the four types of the plurality of pinions Pi1 to Pi4 was studied.

As a result of exhaustively carrying out such studies, the present inventors arrived at the finding shown in FIG. 5.

In the diagram D1 in FIG. 5, a "target acceleration fluctuation" is a target value of an acceleration fluctuation which is imparted to the automobile 1 during gear-shifting of the automatic transmission 8. A "lost torque" indicates a torque which is lost inside the automatic transmission 8 when imparting a predetermined AT input torque to the automatic transmission 8. An "equivalent moment of inertia" indicates a moment of inertia which is created in correspondence with an equivalent inertia of the automatic transmission 8. The equivalent moment of inertia may change according to a gear ratio during a shift-change. A magnitude of the gear ratio corresponds to a constant MGR in the diagram.

In addition, in the diagram D1, an "input rotation gradient" corresponds to a time rate of change of the AT input rotation speed. A "clutch transmitted torque" corresponds to a target value of a torque which is transmitted to a friction fastening element of the automatic transmission 8 during gear-shifting of the automatic transmission 8. "Clutch hydraulic pressure" corresponds to a target value of hydraulic pressure which is supplied to a friction fastening element of the automatic transmission 8.

As shown in the diagram D1, when calculating the AT output torque, after the AT input torque and the target acceleration fluctuation are added up, the lost torque is subtracted from the added value. The equivalent moment of inertia is further subtracted from the subtracted value (during a downshift, the equivalent moment of inertia is to be added). By multiplying the subtraction result (or the addition result) by the gear ratio MGR, the AT output torque can be calculated.

On the other hand, after multiplying the AT output torque calculated as described above by a constant K2, the multiplied value is subtracted from the AT input torque. By multiplying the subtraction result by a negative first power of a constant K1, the input rotation gradient is obtained. By adding up a numerical value obtained by multiplying the input rotation gradient obtained as described above by a constant K3 and a numerical value obtained by multiplying the AT output torque by a constant K4, the clutch transmitted torque can be obtained. Finally, by multiplying the clutch transmitted torque obtained as described above by a constant K5 as a hydraulic pressure conversion factor, the clutch hydraulic pressure is to be obtained.

In this case, among the constants K1 to K5, at least the constants K1 to K4 are parameters which take the equivalent inertia of the automatic transmission 8 into consideration and are determined in advance according to an experiment, a simulation, or the like. The constant K5 as a hydraulic pressure conversion factor can also be determined in advance. The constants K1 to K5 are parameters based on a hardware configuration of the automatic transmission 8 such as the inertia thereof.

Values of the constants K1 to K5 determined in advance are stored in advance in the controller 20 to be read as appropriate when necessary. While the constants K1 to K5 are parameters set according to specifications of the automatic transmission 8, the constants K1 to K5 are fixed values which do not change according to operational states of the automobile 1, the engine 4, the motor 5, and the automatic transmission 8 such as a shift stage.

In addition, when tracing backwards the relationship shown in FIG. 5, it is found that, when a desired AT output torque (=TQ) and a desired input rotation gradient (=ΔR) are given, an AT input torque (=tq) which corresponds to values thereof is uniquely determined as shown in equation (1) below.

$$tq = K1 \times \Delta R + K2 \times TQ \quad (1)$$

Based on equation (1) above, the controller 20 according to the present embodiment can calculate the AT input torque from the AT output torque and the input rotation gradient. In a similar manner, the controller 20 can calculate the AT output torque from the input rotation gradient and the AT input torque based on a mathematical expression obtained by transforming equation (1) above with respect to TQ and calculate the input rotation gradient from the AT input torque and the AT output torque based on a mathematical expression obtained by transforming equation (1) above with respect to ΔR.

(Gear-Shifting Processing)

Figure 6A:
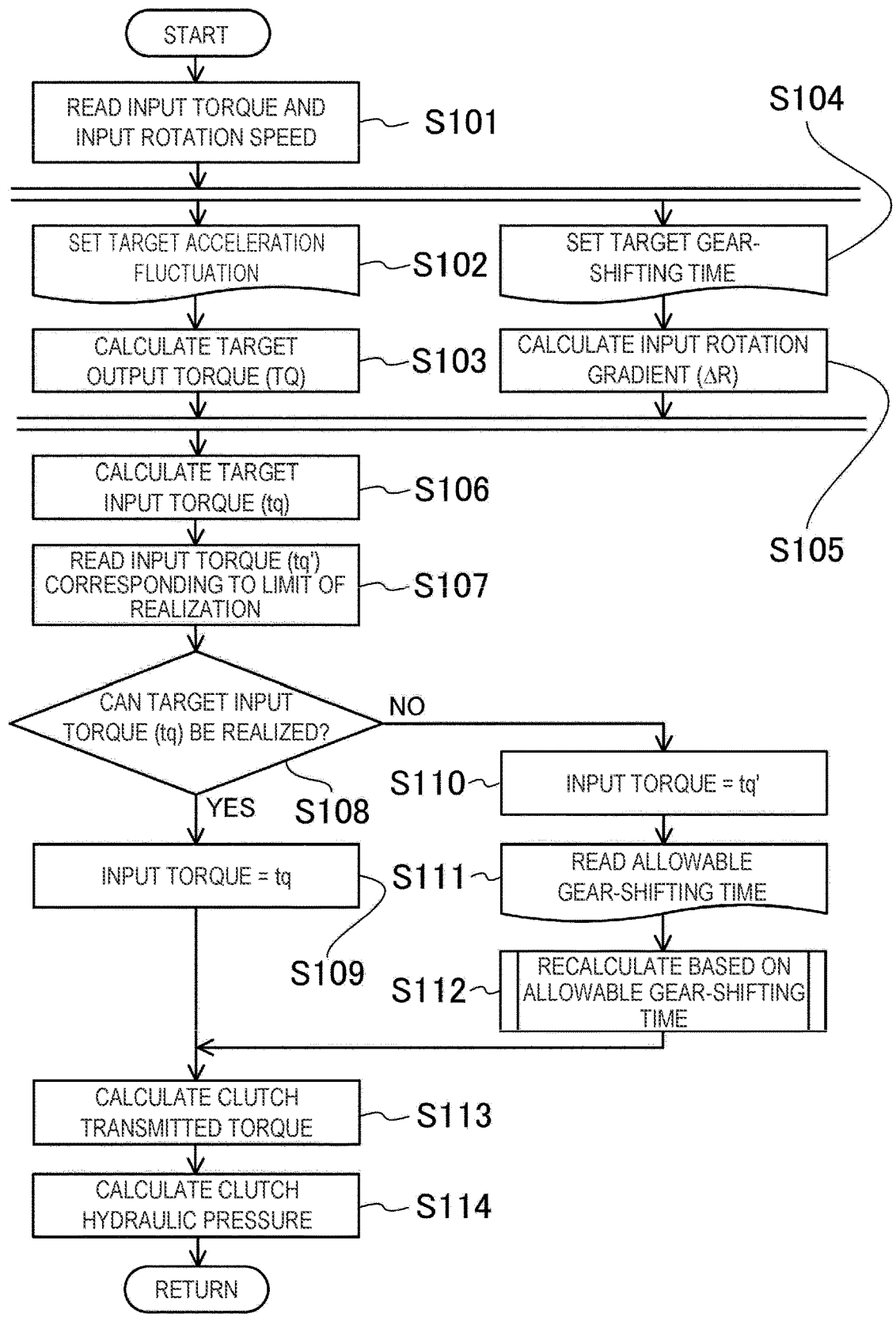
FIG. 6A is a flow chart of gear-shifting control.
Figure 6B:
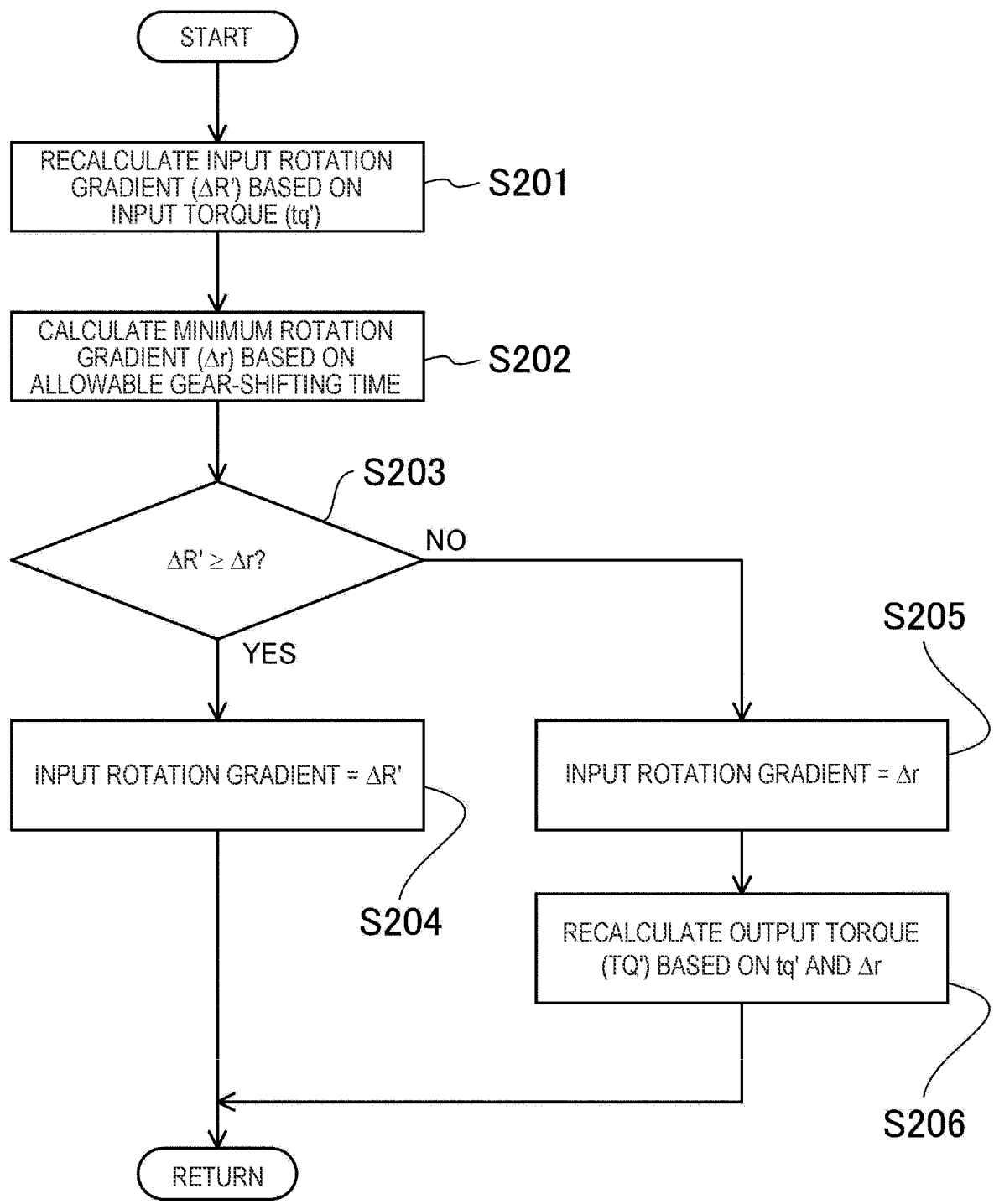
FIG. 6B is a flow chart of gear-shifting control.
Figure 7:
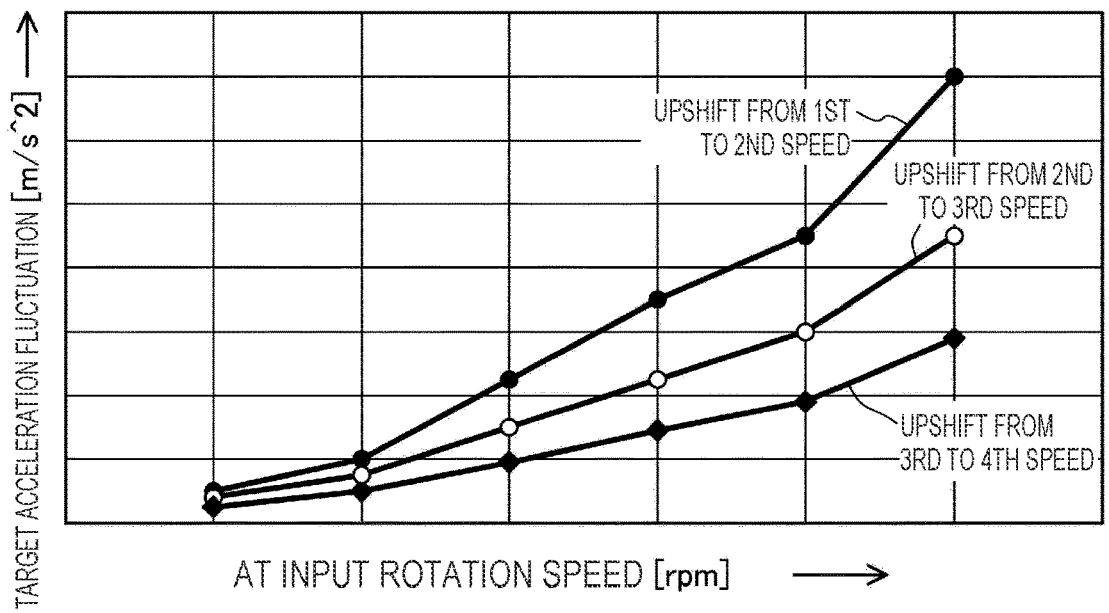
FIG. 7 is a diagram showing a magnitude of a target acceleration fluctuation with respect to the AT input rotation speed during an upshift.
Figure 8:
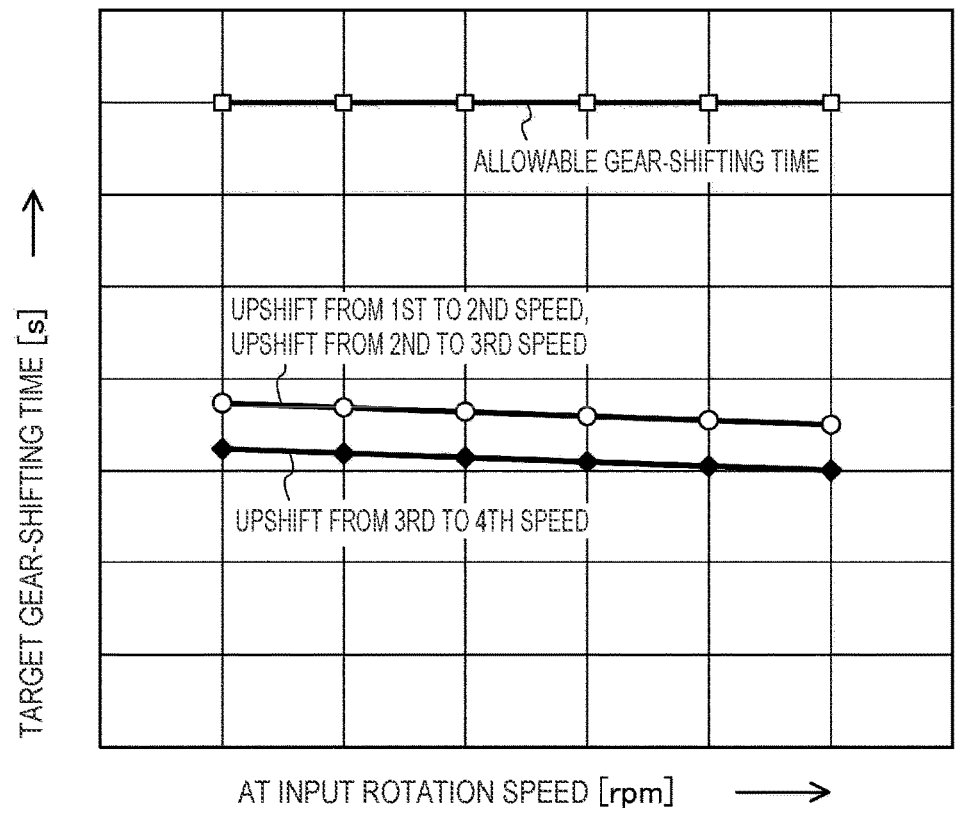
FIG. 8 is a diagram showing a length of a target gear-shifting time with respect to the AT input rotation speed during an upshift.

FIGS. 6A and 6B are flow charts of gear-shifting control. In addition, FIG. 7 is a diagram showing a magnitude of a fluctuation in target acceleration with respect to the AT input rotation speed which is used during an upshift. FIG. 8 is a diagram showing a length of a target gear-shifting time with respect to the AT input rotation speed which is used during an upshift.

In this case, FIG. 6B shows processing performed in step S112 in FIG. 6A. In addition, both FIGS. 6A and 6B are simply examples. For example, instead of executing step S102 and step S103, and step S104 and step S105, in FIG. 6A in parallel, the four steps may be executed one step at a time.

In step S101 after starting the process, the controller 20 reads a present AT input torque and a present AT input rotation speed. The process subsequently proceeds to each of step S102 and step S103.

In step S102, the controller 20 sets a target acceleration fluctuation according to a shift stage. The acceleration referred to at this point refers to acceleration in a vehicle front-rear direction of the automobile 1. The target acceleration fluctuation is calculated according to the shift stage and the AT input rotation speed of the automatic transmission 8 based on a relational expression or a map set for each of an upshift and a downshift.

FIG. 7 represents an example of a map which is used during an upshift. A map which is used during a downshift is configured in a similar manner to FIG. 7.

As shown in FIG. 7, when the AT input rotation speed is high, the controller 20 sets a large target acceleration fluctuation as compared to when the AT input rotation speed is low. When the AT input rotation speed is high, imparting the driver with a "gear-shifting feeling" during an upshift or a downshift is allowed.

In addition, when the AT input rotation speed is high, the controller 20 sets a change amount of the target acceleration fluctuation to a large change amount in a positive direction as compared to when the AT input rotation speed is low. In other words, when the AT input rotation speed is high, a first derivative of the target acceleration fluctuation with respect to the AT input rotation speed is large as compared to when the AT input rotation speed is low.

Furthermore, when the shift stage during gear-shifting is high, the controller 20 sets a large target acceleration fluctuation as compared to when the shift stage is low. When the shift stage is high, imparting the driver with the "gear-shifting feeling" described above is allowed.

In subsequent step S103, the controller 20 calculates a target value (=TQ) of the AT output torque which is output from the output shaft 8b from the target acceleration fluctuation. The target value corresponds to a target value of a torque fluctuation of the output shaft 8b during gear-shifting of the automatic transmission 8. A magnitude of the target value exhibits similar behavior to the target acceleration fluctuation. Hereinafter, the target value of the AT output torque will also be referred to as a "target output torque." In addition, as is apparent from the fact that the target acceleration fluctuation is set by referring to the shift stage, the calculation of the target output torque is performed according to the shift stage.

In other words, when the AT input rotation speed (the rotation speed of the input shaft 8a) is high, the target value of the AT output torque is larger than when the AT input rotation speed is low. In addition, when the AT input rotation speed is high, the target value of the AT output torque has a larger change rate with respect to the AT input rotation speed than when the AT input rotation speed is low. Furthermore, when the shift stage during gear-shifting is high, the controller 20 sets a large target value of the AT output torque as compared to when the shift stage is low.

On the other hand, in step S104, the controller 20 sets a target gear-shifting time. The target gear-shifting time is a target value of time required to perform gear-shifting of the automatic transmission 8. More specifically, while a description of the target gear-shifting time may overlap with the description of the gear-shifting time, the target gear-shifting time corresponds to a target value of time during which the AT input torque is temporarily increased or decreased in torque-regulating control and corresponds to a target value of time required to adjust the rotation speed between the input shaft 8a and the output shaft 8b. The target gear-shifting time is calculated from the shift stage and the AT input rotation speed of the automatic transmission 8 based on a relational expression or a map set to each of an upshift and a downshift. The calculation of the target gear-shifting time is performed according to the shift stage.

FIG. 8 represents an example of a map which is used during an upshift. A map which is used during a downshift is configured in a similar manner to FIG. 8.

As shown in FIG. 8, when the AT input rotation speed is high, the controller 20 sets a small target gear-shifting time as compared to when the AT input rotation speed is low. When the AT input rotation speed is high, responsiveness during gear-shifting is emphasized by decreasing the target gear-shifting time, and when the AT input rotation speed is low, the suppression of shock is emphasized by increasing the target gear-shifting time.

In addition, when the shift stage during gear-shifting is high, the controller 20 sets the target gear-shifting time to be smaller than when the shift stage is low. When the shift stage is high, responsiveness during gear-shifting is emphasized.

Furthermore, when the shift stage is equal to or lower than a predetermined stage (in the illustrated example, in a case of an upshift from the first stage or the second stage), the controller 20 sets the target gear-shifting time to be constant regardless of whether the shift stage is high or low. In the illustrated example, the target gear-shifting time is set such that the target gear-shifting time when shifting up from the first stage to the second stage and the target gear-shifting time when shifting up from the second stage to the third stage coincide with each other.

In subsequent step S105, the controller 20 calculates the target value ($=\Delta R$) of the input rotation gradient of the automatic transmission 8 from the set target gear-shifting time. The target value corresponds to a target value of a time rate of change of the AT input rotation speed during gear-shifting of the automatic transmission 8. The magnitude of the target value becomes smaller as the target gear-shifting time becomes larger. Hereinafter, the target value of the input rotation gradient will also be referred to as a "target rotation gradient."

In other words, when the target gear-shifting time is high, the target value of the input rotation gradient is small as compared to when the target gear-shifting time is low. In addition, when the AT input rotation speed during gear-shifting is high, the target value of the input rotation gradient is set large as compared to when the AT input rotation speed during gear-shifting is low. Furthermore, the target value of the input rotation gradient is large when the shift stage is high as compared to when the shift stage is low and, when the shift stage is equal to or lower than a predetermined stage, the target value of the input rotation gradient becomes constant regardless of whether the shift stage is high or low.

After step S103 and step S105, the process advances to step S106. In step S106 and in step S107 and step S108 which follow step S106, the controller 20 determines whether or not the target increase/decrease amount ($=\Delta tq$) of the AT input torque can be realized under the present state of the engine 1 based on calculation results according to the shift stage of the target output torque (TQ) and the target rotation gradient ($\Delta R$).

Specifically, the controller 20 calculates a limit input torque ($=tq'$) indicating a limit value of the AT input torque which can be realized under the present state of the engine 4, and determines, based on the limit input torque ($tq'$), whether or not the target increase/decrease amount ($\Delta tq$) can be realized under the present state of the engine 4.

Specifically, in step S106, the controller 20 calculates a target value ($=tq$) of the AT input torque based on results of the target output torque (TQ) and the target rotation gradient ($\Delta R$). Hereinafter, the target value of the AT input torque will also be referred to as a "target input torque."

The calculation of the target input torque tq can be performed based on the relational expressions described earlier. For example, in the present embodiment, the controller 20 calculates the target input torque tq based on equation (1) described earlier.

In subsequent step S107, the controller 20 reads the AT input torque ($tq'$) which corresponds to a limit of realization of the engine 1. Hereinafter, an input torque corresponding to the limit of realization will also be referred to as a "limit input torque."

The limit input torque is calculated by the PCM of the controller 20 based on a present operational state of the engine 1 such as a vehicle speed, a wheel speed, and an accelerator opening. The calculation results by the PCM are transmitted to the TCM of the controller 20 through the CAN 12, and step S107 is performed by reading transmission results thereof.

When temporarily decreasing the AT input torque during torque-regulating control, the limit input torque corresponds to a lower limit value of the target input torque. When temporarily increasing the AT input torque during torque-regulating control, the limit input torque corresponds to an upper limit value of the target input torque.

In subsequent step S108, based on the target input torque (tq) and the limit input torque ($tq'$) acquired in step S106 and step S107, the controller 20 determines whether or not an increase or decrease of the former target input torque tq can be realized.

As indicated by context between step S108 and steps S113 and S114 to be described later, the controller 20 determines, prior to the start of adjustment of the difference in rotation speed (in other words, the start of gear-shifting), whether or not the target input torque (tq) or the target increase/decrease amount ($\Delta tq$) can be realized under the present state of the engine 1.

For example, the determination of step S108 may be performed by comparing a difference between the present AT input torque read in step S101 and the target input torque (tq) and a difference between the present AT input torque and the limit input torque ($tq'$) with each other. In this case, the former difference corresponds to the target increase/decrease amount ($\Delta tq$) described earlier. A determination that the target increase/decrease amount ($\Delta tq$) can be realized may be made when the target increase/decrease amount ($\Delta tq$) is smaller than the difference between the present AT input torque and the limit input torque ($tq'$) but a determination that the target increase/decrease amount ($\Delta tq$) cannot be realized may be made when the target increase/decrease amount ($\Delta tq$) is larger than the difference. The "difference" in this case means an absolute value of a difference between the two values.

Instead of such a determination, for example, the determination of step S108 may be made by directly comparing the target input torque (tq) and the limit input torque (tq') with each other. In this case, while the target increase/decrease amount (Δtq) itself is not directly calculated, a determination according to the target increase/decrease amount (Δtq) is to be consequently and indirectly made.

Instead of such a determination, based on equation (1) or the like, the controller 20 may directly calculate the target increase/decrease amount (Δtq) of the AT input torque based on calculation results according to the shift stage of the target output torque (TQ) and the target rotation gradient (ΔR), and determine whether or not the target increase/decrease amount (Δtq) can be realized under the present state of the engine 1 based on a result of the calculation.

The processing shown in step S106 to step S108 is equivalent to processing of determining whether or not a correction of the target output torque (TQ) and the target rotation gradient (ΔR) is necessary.

In other words, when a determination of YES is made in step S108 (when the target increase/decrease amount (Δtq) can be realized), the process advances to step S109. In this case, the target value of the AT input torque is maintained to the target input torque (=tq) described earlier.

When the process advances to step S109, it is determined that a correction of the target output torque (TQ) and the target rotation gradient (ΔR) is unnecessary. In this case, in step S113 which follows step S109, the controller 20 calculates the clutch transmitted torque (=tc) which corresponds to the target input torque (tq) and the target increase/decrease amount (Δtq) thereof based on the target output torque (TQ) and the target rotation gradient (ΔR) calculated in step S103 and step S105 and on equation (2) below.

$$tc = K3 \times \Delta R + K4 \times TQ \quad (2)$$

Subsequently, in step S114 which follows step S113, the controller 20 calculates the clutch hydraulic pressure (pc) which corresponds to the target input torque (tq) and the target increase/decrease amount (Δtq) thereof based on equation (3) below.

$$pc = K5 \times tc \quad (3)$$

Subsequently, the controller 20 supplies hydraulic pressure to each of the friction fastening elements (such as the K1 clutch) so as to realize the calculated clutch hydraulic pressure. Accordingly, the automatic transmission 8 performs a downshift or an upshift.

In doing so, the controller 20 temporarily increases or decreases the AT input torque so as to realize the target increase/decrease amount (Δtq) in conjunction with the downshift or the upshift.

Accordingly, the torque-regulating control described earlier is performed and, at the same time, a desired target output torque (TQ) is to be realized. In this case, the controller 20 executes the gear-shifting control and the torque-regulating control for a duration of the target gear-shifting time set in step S104 shown in FIG. 6A.

The controller 20 may temporarily increase or decrease the AT input torque as compared to during a non-shift-change so as to realize the target increase/decrease amount (Δtq) in conjunction with the downshift or the upshift. More specifically, the controller 20 may temporarily increase or decrease the AT input torque as compared to during non-adjustment of the rotation speed of the input shaft 8a and the output shaft 8b so as to realize the target increase/decrease amount (Δtq) in conjunction with the downshift or the upshift. The temporary increase or decrease of the AT input torque can be performed mainly using the motor 5.

In contrast, when a determination of NO is made in step S108 (when the target increase/decrease amount (Δtq) cannot be realized), the process advances to step S110. In this case, the target value of the AT input torque is changed to the limit input torque (tq').

Specifically, when the process advances to step S110, it is determined that a correction of the target output torque (TQ) and the target rotation gradient (ΔR) is necessary. In this case, in step S111 following step S110, the controller 20 reads an allowable gear-shifting time set in advance.

As shown in FIG. 8, the allowable gear-shifting time is set in advance to be a longer time than the target gear-shifting time with respect to all AT input rotation speeds and all shift stages. When the process advances to step S110, the controller 20 executes the torque-regulating control based on such an allowable gear-shifting time.

Subsequently, in step S112 which follows step S111, the controller 20 performs a correction of the target output torque (TQ) and/or the target rotation gradient (ΔR) based on the read allowable gear-shifting time.

FIG. 6B shows processing performed in step S112.

In the flow shown in FIG. 6B, the controller 20 calculates a second time rate of change which corresponds to the allowable gear-shifting time as a time rate of change of rotation input to the input shaft 8a and executes the torque-regulating control based on the second time rate of change. The second time rate of change in this case corresponds to a "minimum rotation gradient (Δr)" to be described later. The second time rate of change is small as compared to the target rotation gradient (ΔR) corresponding to the target gear-shifting time set in step S104.

Specifically, the controller 20 calculates a third time rate of change which is required to realize the limit input torque (tq') while maintaining the target output torque (TQ) as a time rate of change of rotation input to the input shaft 8a and executes the torque-regulating control based on the second time rate of change and the third time rate of change. The third time rate of change in this case corresponds to a "target rotation gradient after recalculation (ΔR')" to be described later. The third time rate of change is not necessarily smaller than the second time rate of change.

Specifically, first, in step S201 after start of the process, the controller 20 recalculates the target rotation gradient based on the limit input torque (tq') having been changed as a target value of the AT input torque. When the target rotation gradient after the recalculation is denoted by ΔR', ΔR' can be calculated based on equation (4) below.

$$\Delta R' = (tq' - K2TQ)/K1 \quad (4)$$

Equation (4) is obtained by transforming equation (1) above so that an expression related to the target rotation gradient is created.

Subsequently, in step S202 which follows step S201, the controller 20 calculates a time rate of change of a rotation input to the input shaft 8a based on the allowable gear-shifting time.

Specifically, in step S202, using the allowable gear-shifting time in place of the target gear-shifting time, the controller 20 calculates a minimum rotation gradient (=Δr) corresponding to the allowable gear-shifting time. The minimum rotation gradient is a lower limit value of the time rate of change of the AT input rotation speed during gear-shifting of the automatic transmission 8. The lower limit value corresponds to a value specified by constraints of hardware of the engine 4.

Subsequently, in step S203 which follows step S202, the controller 20 determines whether or not the target rotation gradient (ΔR') recalculated in step S201 can be realized under the present state of the engine 1. For example, the determination can be made based on whether or not the recalculated target rotation gradient (ΔR') is equal to or greater than the minimum rotation gradient (Δr) calculated in step S202. The determination can be made by comparing absolute values of the respective values with each other.

In other words, when the recalculated target rotation gradient (ΔR') is equal to or greater than the minimum rotation gradient (Δr) calculated in step S202, the controller 20 determines that the recalculated target rotation gradient (ΔR') can be realized. In this case, the process advances from step S203 to step S204.

When the process advances to step S204, the controller 20 maintains the target output torque (TQ) at the value calculated in step S103 and executes the torque-regulating control based on the target output torque (TQ) and the target rotation gradient (ΔR') as the third time rate of change. In this case, while the target input torque is changed to the limit input torque (tq'), the target output torque is maintained to the value calculated in step S103. In this case, a waveform of the G-force fluctuation is maintained at the initially desired waveform.

Specifically, in step S204, the controller 20 adopts the recalculated target rotation gradient (ΔR') as the target rotation gradient (in other words, ΔR=ΔR').

Subsequently, the process returns from the flow shown in FIG. 6B and advances to step S113 in FIG. 6A. In this case, only the target rotation gradient (ΔR) among the target output torque (TQ) and the target rotation gradient (ΔR) is to be corrected so as to be changed to ΔR'.

In contrast, when the recalculated target rotation gradient (ΔR') is smaller than the minimum rotation gradient (Δr) calculated in step S202, the controller 20 determines that the recalculated target rotation gradient (ΔR') cannot be realized. In this case, the process advances from step S203 to step S205.

When the process advances to step S205, the controller 20 recalculates the target output torque (TQ) based on the minimum rotation gradient (Δr) as the second time rate of change and executes the torque-regulating control based on the recalculated target output torque (TQ') and the minimum rotation gradient (Δr). In this case, the target input torque is changed to the limit input torque (tq') and, at the same time, the target output torque (TQ) is also changed to the recalculated value (TQ'). The waveform of the G fluctuation is to be changed from the initially desired waveform.

Specifically, in step S205, the controller 20 adopts the minimum rotation gradient (Δr) as the target rotation gradient (in other words, ΔR=Δr).

Subsequently, in step S206 which follows step S205, the controller 20 recalculates the target output torque based on the minimum rotation gradient (Δr) as the target rotation gradient and the limit input torque (tq') as the target input torque. When the target output torque after the recalculation is denoted by TQ', TQ' can be calculated based on equation (5) below.

$$TQ'=(tq'-K1 \times \Delta r)/K2 \quad (5)$$

Equation (5) is obtained by transforming equation (1) above so that an expression related to the target output torque is created. Subsequently, the process returns from the flow shown in FIG. 6B and advances to step S113 in FIG. 6A. In this case, both the target output torque (TQ) and the target rotation gradient (ΔR) are to be corrected so as to be changed to TQ' and Δr, respectively.

When the process returns from step S204 or step S206 and advances to step S113, based on the target output torque and the target rotation gradient of at least one has been corrected and on equation (2) above, the controller 20 calculates the clutch transmitted torque (=tc) corresponding to the limit input torque (tq') or, more accurately, the clutch transmitted torque corresponding to the target output torque and the target rotation gradient of at least one has been corrected.

Subsequently, in step S114, the controller 20 calculates clutch hydraulic pressure (pc) which corresponds to the limit input torque (tq') based on equation (3) above. The clutch hydraulic pressure corresponds to a target value of hydraulic pressure which is supplied to the friction fastening elements of the automatic transmission 8.

Subsequently, the controller 20 supplies hydraulic pressure to each of the friction fastening elements so as to realize the calculated clutch hydraulic pressure. Accordingly, the automatic transmission 8 performs a downshift or an upshift. In doing so, the controller 20 executes the torque-regulating control so as to realize the target increase/decrease amount (Δtq') which corresponds to the limit input torque (tq') in conjunction with the downshift or the upshift. Accordingly, the torque-regulating control is performed and, at the same time, a desired target output torque (TQ or TQ') is to be realized.

When the minimum rotation gradient (Δr) is adopted as the target rotation gradient (ΔR=Δr), the controller 20 executes the gear-shifting control and the torque-regulating control for a duration of the allowable gear-shifting time instead of the target gear-shifting time set in step S104 shown in FIG. 6A.

On the other hand, when the recalculated target rotation gradient (ΔR') is adopted as the target rotation gradient (ΔR=ΔR'), the controller 20 executes the gear-shifting control and the torque-regulating control for a duration of a gear-shifting time which corresponds to the recalculated target rotation gradient (ΔR') instead of the target gear-shifting time set in step S104 shown in FIG. 6A.

<Control Example>

Figure 9:
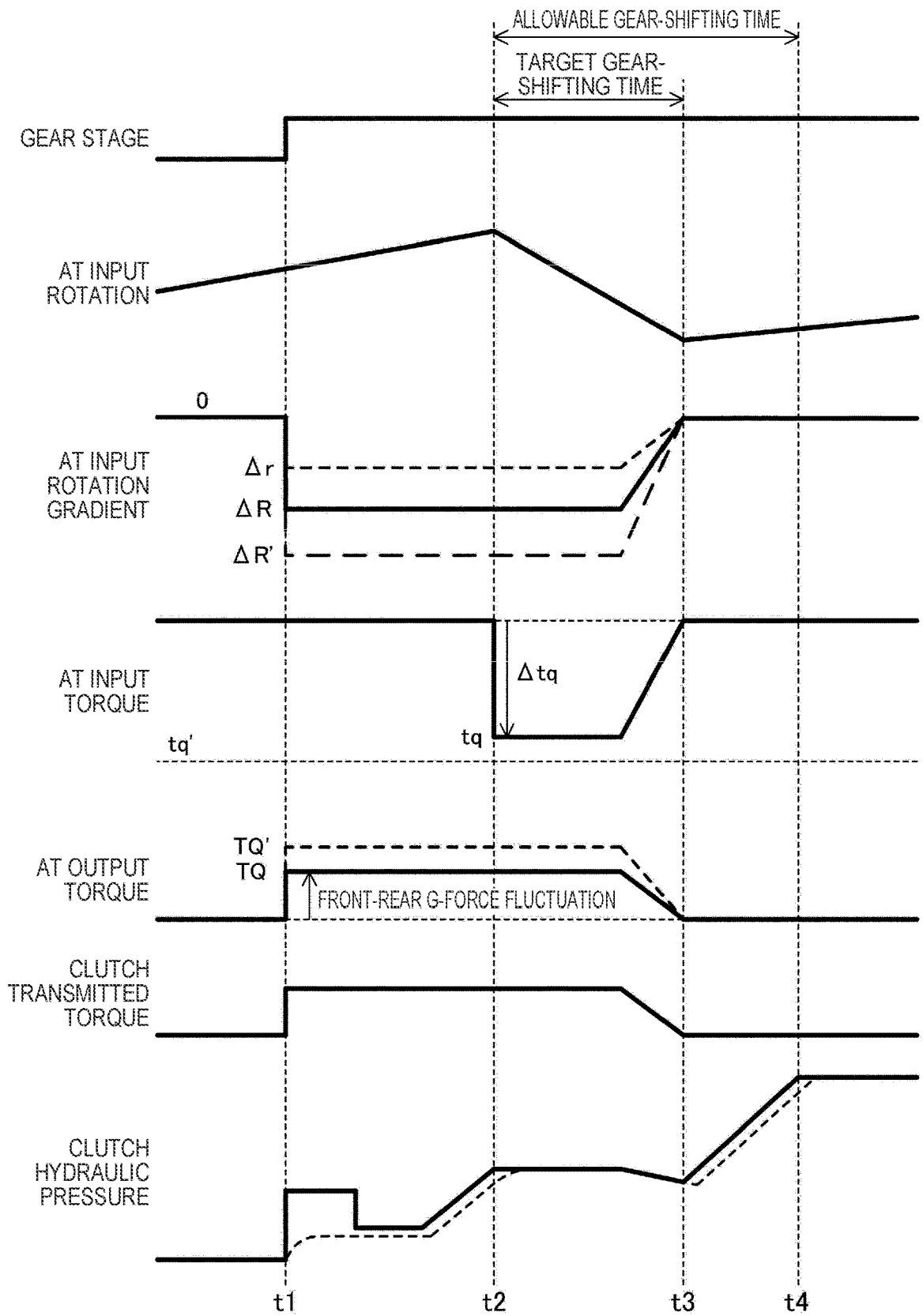
FIG. 9 is a time chart of gear-shifting control.

Next, gear-shifting control will be described with reference to a time chart shown in FIG. 9. The time chart includes a change in a gear stage, a change in AT input rotation, a change in an AT input rotation gradient (target rotation gradient), a change in an AT input torque (target input torque), a change in an AT output torque (target output torque), a change in a clutch transmitted torque, and a change in clutch hydraulic pressure.

First, at a time t1, it is assumed that an upshift of a shift stage has been performed. In this case, the AT input rotation continues to rise for a predetermined period after the time t1. Subsequently, the AT input rotation drops at the time t2 which is a timing after the time t1. An adjustment of the rotation speed between the input shaft 8a and the output shaft 8b is performed from the time t2 to the time t3.

In addition, assuming that the adjustment of the rotation speed is completed and gear-shifting is perfectly completed at the time t3 which is a timing after the time t2, the AT input rotation once again rises after the time t3.

In this case, the controller 20 starts calculating the target rotation gradient (ΔR) at approximately the same time (in other words, at the time t1) as a shift-change of the shift stage. In other words, in preparation of the torque-regulating control which is executed during a shift-change, the controller 20 reads a target gear-shifting time and, at the same time, calculates the target rotation gradient (ΔR) based on the target gear-shifting time (refer to the third graph in FIG. 9).

In addition, the controller 20 starts calculating the target output torque (TQ) at approximately the same time (in other words, at the time t1) as a shift-change of the shift stage. In other words, in preparation of the torque-regulating control which is executed during a shift-change, the controller 20 reads a target acceleration fluctuation and, at the same time, calculates the target output torque (TQ) based on the target acceleration fluctuation (refer to the fifth graph in FIG. 9).

Furthermore, prior to actually starting the torque-regulating control (for example, an interval after the time t1 and before the time t2), the controller 20 starts determination of the target input torque (tq) and, eventually, the target increase/decrease amount (Δtq) thereof based on the target rotation gradient (ΔR) and the target output torque (TQ).

The controller 20 determines, based on the present AT input torque, the target increase/decrease amount (Δtq), and the limit input torque (tq') which can be realized under the present state of the engine 1, whether or not the target increase/decrease amount (Δtq) can be realized under the present state of the engine 1.

When a result of the determination described above is YES, the controller 20 starts the torque-regulating control at the time t2 in conjunction with the dropping of the AT input rotation speed. In this case, the torque-regulating control is to be performed until the time t3 at which the AT input rotation speed once again rises. A length of the period from the time t2 to the time t3 is equivalent to the target gear-shifting time described earlier. The torque-regulating control in this case acts to temporarily decrease the AT input torque.

In addition, the controller 20 calculates the clutch transmitted torque (tc) and, eventually, the clutch hydraulic pressure (pc) based on the target rotation gradient (ΔR) and the target output torque (TQ). By operating friction fastening elements of the automatic transmission 8 based on the clutch hydraulic pressure pc, gear-shifting can be performed while realizing a desired target output torque.

Accordingly, for example, from the time t1 to the time t3, the controller 20 temporarily increases the AT output torque by an amount corresponding to the target acceleration fluctuation. By temporarily increasing the AT output torque, the front-rear G-force temporarily increases and an adequate "gear-shifting feeling" can be imparted to the occupants. When inertia inside the automatic transmission 8 is large, there is a risk that a depression may be created in the waveform of the AT output torque as a result of performing the torque-regulating control in conjunction. However, by adopting a configuration of back-calculating, from a desired AT output torque and a desired gear-shifting time, an AT input torque necessary for realizing the AT output torque and the gear-shifting time and based on a relational expression which takes the inertia into consideration, an occurrence of such a depression can be suppressed and a desired G-force waveform can be realized.

On the other hand, when a result of the determination described above is NO, before starting the torque-regulating control, the controller 20 recalculates the target rotation gradient (ΔR') based on the limit input torque (tq') and, at the same time, determines whether or not the recalculated target rotation gradient (ΔR') is equal to or larger than the minimum rotation gradient (Δr) calculated based on the allowable gear-shifting time.

When the recalculated target rotation gradient (ΔR') is equal to or larger than the minimum rotation gradient (Δr), the controller 20 executes the torque-regulating control in a state where the target rotation gradient (ΔR) is changed to the target rotation gradient (ΔR') based on the limit input torque (tq') without changing the target output torque (TQ). In this case, the clutch transmitted torque (tc) and, eventually, the clutch hydraulic pressure (pc) are also to be changed according to the change in the target rotation gradient (ΔR').

On the other hand, when the recalculated target rotation gradient (ΔR') is smaller than the minimum rotation gradient (Δr), the controller 20 changes the target rotation gradient (ΔR) to the minimum rotation gradient (Δr) and, at the same time, executes the torque-regulating control in a state where the target output torque (TQ) is changed to the target output torque (TQ') based on the allowable gear-shifting time. In this case, the clutch transmitted torque (tc) and, eventually, the clutch hydraulic pressure (pc) are also to be changed according to the change in the target rotation gradient (Δr) and the target output torque (TQ'). In addition, the torque-regulating control in this case is to be executed not during the initial target gear-shifting time which has been set as a period from the time t2 to the time t3 but during the allowable gear-shifting time which has been set as a period from the time t2 to a time t4. In this case, the time t4 is a timing after the time t3.

(Summary)

As described with reference to FIG. 6A, the controller 20 according to the present embodiment determines the target increase/decrease amount (Δtq) of the AT input torque based on respective target values of the AT output torque and the gear-shifting time which are calculated according to a shift stage. In doing so, when the target increase/decrease amount (Δtq) can be realized, the controller 20 executes torque-regulating control so as to realize the target increase/decrease amount.

Adopting the configuration described above enables both the target output torque and the target gear-shifting time to be realized at desired values. Accordingly, an occurrence of a torque shock can be suppressed while suppressing a prolongation of the gear-shifting time. Since each target value is scrupulously set according to a shift stage, even a fluctuation of front-rear acceleration of the automobile 1 which leads to a torque shock can be accurately controlled.

On the other hand, as described with reference to step S112 in FIG. 6A and the like, when the target increase/decrease amount (Δtq) of the AT input torque cannot be realized, the controller 20 executes the torque-regulating control based on an allowable gear-shifting time having been set to be a relatively prolonged time. Accordingly, an occurrence of a torque shock which may impart a greater sense of discomfort than a decline in traveling feeling which accompanies a prolongation of the gear-shifting time can be reliably suppressed. As a result, a control mode in which a sense of discomfort imparted to each of the occupants including the driver is suppressed as much as possible can be realized in various scenes.

In addition, as described with reference to FIG. 6B, when the target increase/decrease amount (Δtq) of the AT input torque cannot be realized, the controller executes the torque-regulating control based on the minimum rotation gradient (Δr) corresponding to an allowable gear-shifting time instead of the initial target value of the gear-shifting time. Accordingly, even when the target increase/decrease amount (Δtq) of the input torque cannot be realized, the torque-regulating control can be smoothly executed without any inconvenience. A smooth execution of the torque-regulating control contributes to suppressing an occurrence of a torque shock.

Furthermore, as described with reference to step S204 in FIG. 6B and the like, when the target increase/decrease amount (Δtq) cannot be realized, the controller 20 changes only a time rate of change of rotation based on the limit input torque (tq') while maintaining the target output torque (TQ) to the initial target value. When the third time rate of change (ΔR) obtained by the change can be realized, the torque-regulating control is executed without changing the output torque. Accordingly, an occurrence of a torque shock which may impart a greater sense of discomfort can be preferentially suppressed.

On the other hand, as described with reference to step S205 in FIG. 6B and the like, when the third time rate of change (ΔR) cannot be realized, the torque-regulating control is executed by not only using the minimum rotation gradient (Δr) as the second time rate of change but by also changing the target output torque according to the minimum rotation gradient (Δr).

In this manner, by adopting a configuration in which the target output torque (TQ) is maintained as much as possible, an occurrence of a torque shock which may impart a greater sense of discomfort can be suppressed as much as possible.

In addition, since a case where the AT input rotation speed is high corresponds to a case where an acceleration request has been issued or the like, a certain amount of torque shock is to be allowed. In other words, when the AT input rotation speed is low, a greater sense of discomfort may be imparted than when the AT input rotation speed is high. In order to suppress such a sense of discomfort, the AT output torque is to be set lower when the AT input rotation speed is low. Accordingly, a sense of discomfort to be imparted to the driver can be more reliably suppressed.

Furthermore, as described with reference to FIG. 8, a certain amount of torque shock is to be allowed on a high-rotation-speed side. Therefore, by prioritizing faster gear-shifting on the high-rotation-speed side while suppressing an occurrence of a torque shock by gear-shifting over a prolonged period on a low-rotation-speed side, control modes respectively suitable for the low-rotation-speed side and the high-rotation-speed side can be realized.

In addition, as described with reference to FIG. 8, since a drive scene in which the shift stage is high basically corresponds to when traveling at a high vehicle speed, a certain amount of torque shock is to be allowed. In other words, when the shift stage is low, a greater sense of discomfort may be imparted than when the shift stage is high. In order to suppress such a sense of discomfort, the gear-shifting time is to be set longer when the AT input rotation speed is low. By prolonging the gear-shifting time, a sense of discomfort to be imparted to the driver can be more reliably suppressed.

Furthermore, as described with reference to FIG. 8, by setting the target value of the gear-shifting time to be constant regardless of whether the shift stage is high or low when the shift stage is equal to or lower than a predetermined stage, a certain gear-shifting feel can be imparted to the driver. Accordingly, the traveling feeling of the vehicle can be enhanced.

In addition, as described with reference to FIG. 6A and the like, by making a determination of the target increase/decrease amount (Δtq) prior to adjusting a difference in rotation speed between the input shaft 8a and the output shaft 8b, the determination can be executed at an earlier timing. Accordingly, the target increase/decrease amount (Δtq) can be fixed without being late for the start of gear-shifting control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile (vehicle)
2F Front wheel
2R Rear wheel (drive wheel)
20 Controller
4 Engine
57 AT input torque sensor
58 AT input rotation speed sensor
8 Automatic transmission
8a Input shaft
8b Output shaft

The invention claimed is:

1. A vehicle gear-shifting control apparatus, comprising:
an engine which is mounted to a vehicle and which generates a travel drive force of the vehicle;
a hydraulically controlled automatic transmission which has an input shaft connected to the engine and an output shaft connected to a drive wheel of the vehicle and which subjects an input rotation to gear-shifting at a transmission gear ratio corresponding to a selected shift stage and outputs the gear-shifted input rotation; and
a controller which changes the shift stage of the automatic transmission by outputting a gear-shifting signal in accordance with a rotation speed of the input shaft to the automatic transmission, wherein
the controller executes a torque-regulating control in which, during a shift-change of the shift stage, an input torque input to the input shaft is temporarily increased or decreased as compared to during a non-shift-change, and
when executing the torque-regulating control, the controller is configured to:
determine whether or not a target increase/decrease amount of the input torque can be realized under a present state of the engine based on calculation results according to the shift stage of a target value of an output torque which is output from the output shaft and a target value of a gear-shifting time which is required for the shift-change,
execute the torque-regulating control so as to realize the target increase/decrease amount when it is determined that the target increase/decrease amount can be realized, and
execute the torque-regulating control based on an allowable gear-shifting time set in advance to be longer than the target value of the gear-shifting time instead of based on the target value when it is determined that the target increase/decrease amount cannot be realized.

2. The vehicle gear-shifting control apparatus according to claim 1, wherein
the controller calculates a time rate of change of a rotation input to the input shaft based on the target value of the gear-shifting time and executes the torque-regulating control based on a result of the calculation and the target value of the output torque, and
when it is determined that the target increase/decrease amount cannot be realized, the controller calculates a second time rate of change corresponding to the allowable gear-shifting time as the time rate of change of the rotation input to the input shaft and executes the torque-regulating control based on the second time rate of change.

3. The vehicle gear-shifting control apparatus according to claim 2, wherein
the controller calculates a limit input torque indicating a limit value of the input torque which can be realized under a present state of the engine and determines whether or not the target increase/decrease amount can be realized under the present state of the engine based on the limit input torque,
the controller calculates a third time rate of change required for realizing the limit input torque while maintaining the target value of the output torque as the time rate of change of the rotation input to the input shaft when it is determined that the target increase/decrease amount cannot be realized, and
the controller is further configured to:
  execute the torque-regulating control based on the target value of the output torque and the third time rate of change while maintaining the target value of the output torque when the third time rate of change can be realized, and
  recalculate the target value of the output torque based on the second time rate of change and execute the torque-regulating control based on the recalculated target value of the output torque and the second time rate of change when the third time rate of change cannot be realized.

4. The vehicle gear-shifting control apparatus according to claim 1, wherein
the target value of the output torque is set such that a change rate with respect to the rotation speed of the input shaft increases as the rotation speed increases.

5. The vehicle gear-shifting control apparatus according to claim 1, wherein
the target value of the gear-shifting time decreases as the rotation speed of the input shaft increases.

6. The vehicle gear-shifting control apparatus according to claim 1, wherein
the target value of the gear-shifting time decreases as the shift stage increases.

7. The vehicle gear-shifting control apparatus according to claim 6, wherein
the target value of the gear-shifting time is set constant when the shift stage is equal to or lower than a predetermined stage.

8. The vehicle gear-shifting control apparatus according to claim 1, wherein
the controller changes the shift stage by adjusting a difference in rotation speed between the input shaft and the output shaft and executes the torque-regulating control in conjunction with adjusting the difference in rotation speed, and
the controller determines whether or not the target increase/decrease amount of the input torque can be realized under the present state of the engine prior to starting the adjustment of the difference in rotation speed.

9. The vehicle gear-shifting control apparatus according to claim 1, wherein
the controller calculates a limit input torque indicating a limit value of the input torque which can be realized under the present state of the engine, and determines, based on the limit input torque calculated by the controller based on a present operational state of an accelerator opening, whether or not the target increase/decrease amount can be realized under the present state of the engine.

\* \* \* \* \*